United States Patent
Arimura

(10) Patent No.: US 6,885,927 B2
(45) Date of Patent: Apr. 26, 2005

(54) APPARATUS FOR CONTROLLING AN ELECTRIC POWER STEERING SYSTEM

(75) Inventor: Yutaka Arimura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/407,495

(22) Filed: Apr. 4, 2003

(65) Prior Publication Data

US 2003/0200018 A1 Oct. 23, 2003

(30) Foreign Application Priority Data

Apr. 17, 2002 (JP) ........................................ 2002-114806
Apr. 17, 2002 (JP) ........................................ 2002-114807
Apr. 17, 2002 (JP) ........................................ 2002-114808

(51) Int. Cl.$^7$ .............................................. B62D 5/04
(52) U.S. Cl. ....................................................... 701/41
(58) Field of Search ...................... 701/41, 43; 180/443, 180/446

(56) References Cited

U.S. PATENT DOCUMENTS

2002/0177932 A1 * 11/2002 Kifuku et al. ................ 701/41
2003/0144780 A1 * 7/2003 Recker et al. ................ 701/41

* cited by examiner

Primary Examiner—Thu V. Nguyen
(74) Attorney, Agent, or Firm—Merchant & Gould P.C.

(57) ABSTRACT

An apparatus for controlling an electric power steering system is provided, which has a microcomputer for determining a signal for target current, the other microcomputer for determining a signal for motor control, a motor drive circuit for driving a brushless motor. The apparatus has a feature that the microcomputers can back up each other in controlling an electric power steering system even if failure occurs in one of the microcomputers.

4 Claims, 6 Drawing Sheets

APPARATUS FOR CONTROLLING AN ELECTRIC POWER STEERING SYSTEM

FIELD OF THE INVENTION

The present invention relates to an apparatus for controlling an electric power steering system, in which the apparatus directly exerts power generated by a brushless motor on a steering line so as to reduce the steering torque required of a driver.

BACKGROUND OF THE INVENTION

A direct current motor with brushes has been generally used for an electric power steering system. An electric power steering system with a brushless motor has also been developed, which solves a problem of aged deterioration associated with a direct current motor with brushes. A brushless motor uses a three phase winding as an outer stator and plural permanent magnets as an inner rotor. When the three phase winding is supplied with current depending upon the rotational phase of inner rotor, the inner rotor will rotate. In this way, since a brushless motor does not require a brush, it is free from degradation of steering feeling caused by the abrasion of brush. A brushless motor, whose inner rotor is made of magnets, has a small moment of inertia, thereby preventing degradation of steering feeling caused by a big moment of inertia.

An apparatus for controlling an electric power steering system, which employs a brushless motor, sends a signal for motor control to a motor drive circuit so that the signal drives Field Effect Transistors (FET's) with Pulse Width Modulation (PWM) or switches them off. The apparatus thus determines a signal for target current based upon a signal of steering torque sent by a sensor for detection of steering torque and also compensates this signal for target current by inertia and damper control. These processes are performed so that assist steering torque generated by the brushless motor, which corresponds to target current running through the brushless motor, can be determined. Also the apparatus determines a signal for motor control based upon both a deviation between a signal for target current and a signal of motor current (actual current) sent by a device for detection of motor current, and a phase signal of motor rotation (an actual rotational phase of inner rotor) sent by a device for detection of rotational phase of motor, thereby supplying a target current to the brushless motor. In a motor drive circuit, the FET's are PWM driven based upon the signal for motor control, thereby rotating the brushless motor in a positive or reverse direction.

In the motor drive circuit, the FET's generate heat as a result of some ten amperes of current running therethrough. Also driving of a brushless motor requires accurate control of current depending on the rotational phase of an inner rotor. Two of relatively inexpensive and simple microcomputers, which share control of a brushless motor, are used in an apparatus for controlling an electric power steering system. A current control unit having a microcomputer which determines target current is placed apart from a motor drive circuit. In this way the current control unit can determine accurate target current since analogue circuits and the like for shaping a signal for steering torque are free from the effect of heat. On the other hand, a drive control unit having a microcomputer which determines a signal for motor control is placed in the neighborhood of a brushless motor and device for detection of rotational phase of motor. The drive control unit can thus perform accurate current control for the brushless motor based upon a phase signal of motor rotation which has a small amount of noise and no phase delay as a result of a short transmission path of the signal. These current control and drive control units are electrically coupled by wires, thereby communicating each other. For example, the current control unit sends a signal for target current, and on the other hand the drive control unit sends a phase signal of motor rotation to be used for damper control.

In a general control apparatus, in which plural microcomputers perform shared computation, the microcomputers are electrically connected by wires and various types of synchronization are adopted for mutual communication of data. An apparatus for controlling an electric power steering system has two microcomputers which share the drive control of a brushless motor and perform high-speed communication by clock synchronization.

In this apparatus, a microcomputer for a current control unit serves as a master microcomputer and the other microcomputer for a drive control unit serves as a slave microcomputer. The microcomputer in the current control unit thereby generates clock signals for communication by clock synchronization and transmits the signals to the microcomputer in the drive control unit via wires for clock signals. In this way, the two microcomputers transmit or receive data mutually via the wires.

However, when one of the two microcomputers fails, the apparatus cannot continue a sequence of control which is required by an electric power steering system. The apparatus is thus unable to perform drive control for a brushless motor, thereby failing to exert assist steering torque on a steering line. Also, when the current control unit cannot receive a phase signal of motor rotation due to a disconnection of wires for communication between the current and drive control units, the current control unit cannot perform damper control anymore, thereby damaging steering feeling of a driver.

Further, the microcomputer in current control unit requires data associated with a center value of steering torque, and on the other hand the microcomputer in drive control unit needs an offset value of motor encoder. In this way, each microcomputer reads out the data stored in an Electrically Erasable Programmable Read Only Memory (hereinafter referred to as EEPROM), which is prepared for each microcomputer. Then, the apparatus, which controls a brushless motor with two microcomputers, requires an EEPROM for each microcomputer, thereby resulting in a costly configuration with two EEPROM's.

Signals are transmitted or received by clock synchronization to perform high-speed communication between the two microcomputers. In this communication by clock synchronization, a master microcomputer (a microcomputer in current control unit) transmits data in reference to clock signals generated therein, and on the other hand a slave microcomputer (a microcomputer in drive control unit) receives the data in reference to the clock signals transmitted by the master microcomputer. The slave microcomputer will continue receiving unsynchronized data once a time lag occurs in the received data. This results in a situation that the slave microcomputer cannot receive normal data such as target current, and thereby the slave computer is unable to determine a correct signal for motor control. As a result, the control apparatus for an electric power steering system cannot exert assist steering torque on a steering line.

If the microcomputer in drive control unit is not ready to receive data, a time lag will appear in received data. This type of phenomenon occurs, for example, when components of the microcomputer in drive control unit are not electrically initiated or the initial check of a Central Processing Unit (CPU) has not been completed at starting of a vehicle (turning on of ignition switch). Also when a noise is on a wire running from the microcomputer in current control unit to the microcomputer in drive control unit while data is transmitted, a time lag appears in the data. The microcomputer in drive control unit thus receives unsynchronized signals.

Further, when the slave microcomputer is unable to receive correct clock signals due to a disconnection of wires for clock signals or failure of an interface circuit (port and the like), the master and slave microcomputers cannot communicate data by clock synchronization. In this way, the microcomputer in drive control unit cannot receive correct data (target current and the like) and thereby the apparatus for an electric power steering system cannot exert assist steering torque on a steering line.

SUMMARY OF THE INVENTION

An object of the present invention is to provide an apparatus for controlling an electric power steering system, which is capable of performing failsafe control, even if a failure associated with the shared control of a brushless motor by two control units occurs.

Another object of the present invention is to provide an apparatus for controlling an electric power steering system, which enables sharing of a common memory by the two control units, so that such a problem that each microcomputer requires a memory can be solved.

Still another object of the present invention is to provide an apparatus for controlling an electric power steering system, which enables continuous communication between master and slave microcomputers even if normal communication by clock synchronization fails.

The present invention provides an apparatus for controlling an electric power steering system having, a brushless motor, a sensor for detection of steering torque acting on the steering line, a device for detection of rotation of the motor, a device for detection of current of the motor, a current control unit with a first microcomputer for determining a signal for target current, a drive control unit with a second microcomputer for determining a signal for motor control and wires electrically connecting the current control unit and drive control unit. The apparatus has a feature that the drive control unit incorporates the signal of steering torque from the sensor for detection of steering torque, and if the first microcomputer fails, the second microcomputer determines a signal for target current based upon the signal of steering torque.

According to the apparatus for controlling an electric power steering system, the second microcomputer determines target current based upon a signal of steering torque even if the second microcomputer fails to perform control. And the second microcomputer is able to continue the control of a brushless motor independently and thereby the apparatus can exert assist steering torque on a steering line.

The present invention also provides an apparatus for controlling an electric power steering system, wherein the first microcomputer incorporates the phase signal, and if the second microcomputer fails, the first microcomputer determines a signal for motor control based upon the phase signal and delivers the signal for motor control to the motor drive circuit.

Even if the failure of the second microcomputer occurs, the apparatus thus allows the first microcomputer to determine a signal for motor control based upon a signal for target current and a phase signal of motor rotation and delivers the signal for motor control to a motor drive circuit. In this way, the apparatus continues control for a brushless motor only with the first microcomputer, thereby keeping exerting assist steering torque on a steering line.

The present invention still provides an apparatus, wherein the first microcomputer incorporates a signal of motor rotation from the second microcomputer and performs damper control, and if the first microcomputer can not receive the signal normally, the second microcomputer performs damper control based upon the signal.

Even if the first microcomputer fails to receive the signal of motor rotation correctly, the second microcomputer performs damper control based upon the signal. The apparatus thus allows the second microcomputer to perform compensation for a signal for target current without damper compensation sent by the first microcomputer, thereby maintaining a desirable steering feeling of a driver.

The present invention yet provides an apparatus, wherein the second microcomputer performs damper control based upon a signal of motor rotation.

The apparatus for controlling an electric power steering system allows the second microcomputer to perform continuous damper control for a signal for target current based upon the signal for motor rotation. In this way, even if the first microcomputer fails to receive data, the apparatus allows the second microcomputer to perform damper compensation for the signal for target current, thereby keeping excellent steering feeling of a driver.

The present invention further provides an apparatus for controlling an electric power steering system having a brushless motor, a sensor for detection of steering torque, a device for detection of rotation of the motor, a device for detection of current of the motor, a current control unit with a first microcomputer for determining a signal for target current, a drive control unit with a second microcomputer for determining a signal for motor control and wires electrically connecting the current control unit and drive control unit. The apparatus has a feature that a memory is connected to one of the first and second microcomputers and when the memory is connected to the first microcomputer, data stored in the memory is transmitted from the first microcomputer to the second microcomputer via the wires, and vice versa.

The apparatus makes it feasible for the first and second microcomputers to use a memory in common, thereby allowing communication between the two microcomputers with the data stored in the memory such as EEPROM. Thus, the apparatus does not require a memory for each of the microcomputers, leading to a cost reduction.

The present invention still further provides an apparatus, wherein the second microcomputer sends standby signals notifying the first microcomputer of a ready status of data reception, and then the first microcomputer starts to send data to the second microcomputer after receiving the standby signals.

In the apparatus, when the transmission of data is ready during a vehicular start or after the recovery of a communication error, the second microcomputer sends standby signals to the first microcomputer. And the first microcomputer starts sending data to the second microcomputer after reception of the standby signals. In this way, the apparatus achieves secure data reception by the second microcomputer during a vehicular start, and also provides resumption of normal communication by sending standby signals even if an error occurs during communication.

The present invention yet further provides an apparatus for controlling an electric power steering system having a brushless motor, a sensor for detection of steering torque, a device for detection of rotation of the motor, a device for detection of current of the motor, a current control unit for determining a signal for target current and a drive control unit for determining a signal for motor control. The current control unit has a first microcomputer with a first clock serving as a master microcomputer and the drive control unit has a second microcomputer with a second clock serving as a slave microcomputer, respectively. The apparatus also has first wires for transmitting clock signals and transmitting data between the master and slave microcomputers. The apparatus has a feature that when one of the master and slave microcomputers detects an error in communication therebetween under clock synchronization, the master and slave microcomputers continue communication each other by switching from clock synchronization to an asynchronous technique.

Even if the slave microcomputer cannot perform normal communication with clock synchronization technique due to a problem associated with reception of clock signals generated by the master microcomputer, the apparatus enables continuous communication between the two microcomputers with asynchronous technique.

Abnormality of communication by clock synchronization includes the following exemplary cases such as the failure of slave microcomputer in reception of clock signals generated by the master microcomputer, the failure of master microcomputer in confirmation of the readiness of data reception by slave computer, no data transmission from the master to slave microcomputer in a given period of time and vice versa. And the failure of slave microcomputer mentioned above has various causes such as the disconnection of wires for clock signals, the failure of an interface circuit (port) of transmission or reception side and the failure of an amplifier for amplifying clock signals generated by the master microcomputer.

DESCRIPTION OF THE PREFERRED EMBODIMENTS

Embodiments of the present invention will now be described referring to the accompanying drawings.

a. Failsafe Control

An apparatus for controlling an electric power steering system, which has two control means (microcomputers and the like) for controlling a brushless motor, allocates at least basic functions to both of the means so that a means and the other can back up each other to continue the control of brushless motor, even if one of the two means fails. In this connection, the apparatus allows both means to incorporate signals needed for the control.

The apparatus according to the embodiments to be described has a current control unit for determination for target current for a brushless motor and a drive control unit for driving the brushless motor based upon the target current, which are placed apart and electrically connected by wires. The current control unit having a one-chip microcomputer is placed along a pinion shaft. On the other hand, the drive control unit having the other microcomputer and a motor drive circuit, is placed next to the brushless motor. The embodiments to be described are categorized into three different cases in terms of the microcomputers for the current control unit and drive control unit: two microcomputers are fully redundant each other in a first embodiment, both microcomputers have a function of damper control in a second embodiment and only the microcomputer in drive control unit has a function of damper control in a third embodiment.

Figure 1:
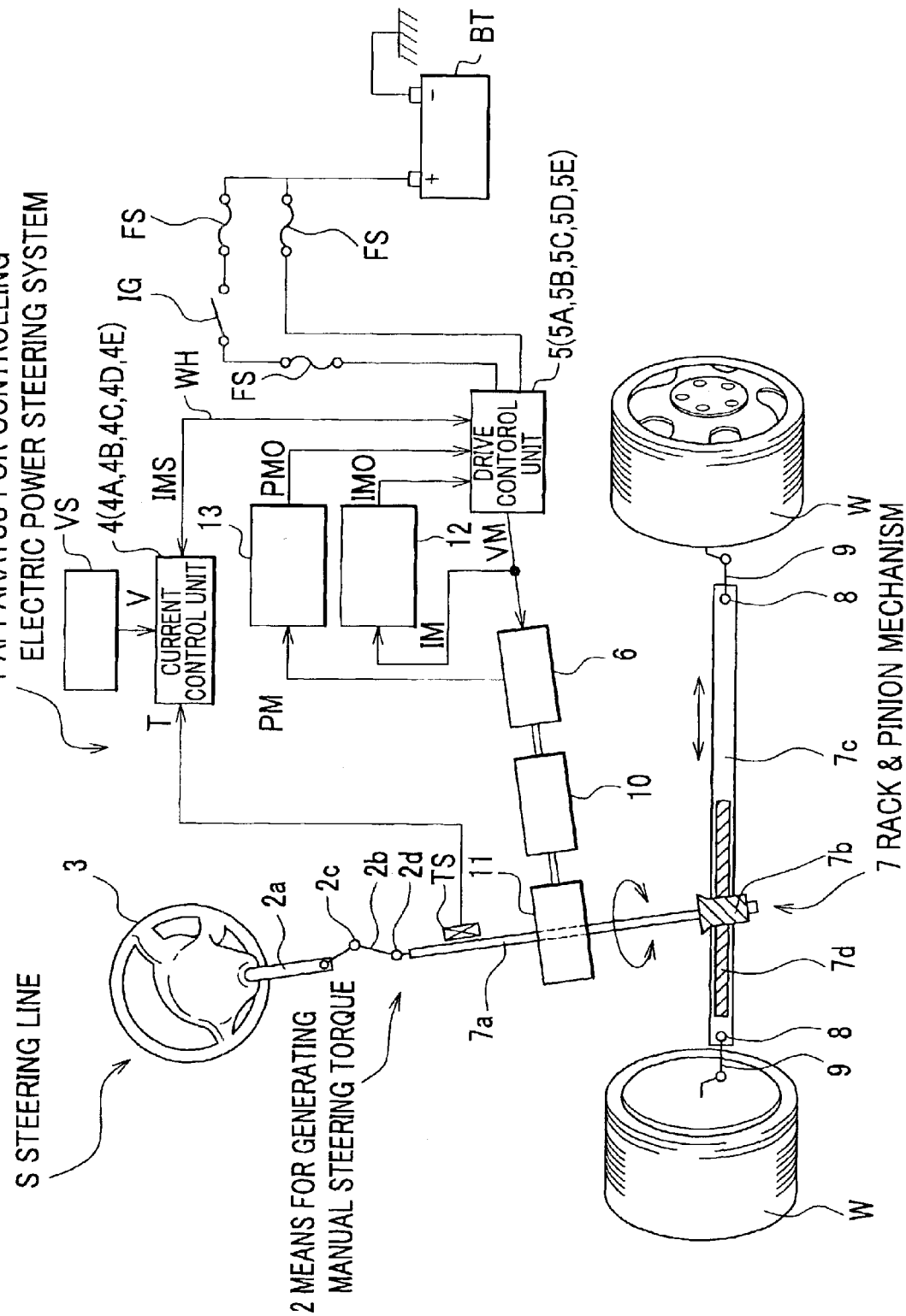
FIG. 1 is a figure describing the overall structure of an apparatus for controlling an electric power steering system according to the present invention. Related components such as a steering wheel, rack & pinion mechanism and the like are also shown in the figure.

First the overall structure of an apparatus for controlling an electric power steering system is described with related components such as a steering wheel, rack & pinion mechanism and the like referring to FIG. 1. FIG. 1 is a figure describing the overall structure of the apparatus, which is applicable to all the three embodiments and also two more embodiments to be described later.

An apparatus 1 for controlling an electrical power steering system, which is provided in a steering line S including a steering wheel 3 to wheels W, assists the steering torque generated by means 2 for generating manual steering torque. A drive control unit 5 of the apparatus 1 generates a motor voltage VM based upon a signal IMS for target current delivered by a current control unit 4. The apparatus 1 further drives a brushless motor 6 based upon the motor voltage VM to generate assist steering torque, thereby reducing the required manual steering torque exerted by the means 2.

The means 2 has a pinion shaft 7a of a rack & pinion mechanism 7 which is coupled to a steering shaft 2a via a connecting rod 2b. The connecting rod 2b has universal joints 2c and 2d at both ends. The rack & pinion mechanism 7 converts the rotational motion of pinion shaft 7a to the reciprocal motion of rack shaft 7c in a lateral direction or a direction of vehicular width by engaging a pinion 7b with rack teeth 7d. At both ends of rack shaft 7c, the right and left forward wheels W are connected to via ball joints 8 and tie rods 9.

The apparatus 1 has the brushless motor 6 so as to generate assist steering torque. The brushless motor 6 exerts assist steering torque on the pinion shaft 7a via a torque limiter 10 and reduction gears mechanism 11.

An electric power steering system, which transmits both steering torque exerted by a driver on the steering wheel 3 and assist torque generated by the brushless motor 6 depending on the steering torque to the pinion shaft 7a, steers the wheels W with the rack & pinion mechanism 7.

The apparatus 1 is contained in a housing (not shown) extending in a direction of vehicular width so that the rack shaft 7c is slidable in a longitudinal direction thereof. The housing also contains the rack & pinion mechanism 7, torque limiter 10 and reduction gears mechanism 11. An upper opening of the housing is closed with a lid (not shown), the middle of which the pinion shaft 7a penetrates and inside of which a torque sensor TS for detection of steering torque is installed. Further, on the external circumferential surface of lid, a container (not shown) for housing the current control unit 4 is disposed.

A side opening of the housing is closed with the other lid (not shown) and a motor case (not shown) is mounted on the surface of lid opposite to the housing. The motor case houses the brushless motor 6 and a device 13 for detection of motor rotation at an end of the brushless motor 6. And on the external circumferential surface of motor case, a container (not shown) for the drive control unit 5 is mounted. In this way, the drive control unit 5 is placed next to the brushless motor 6 and device 13.

Inside the side opening of housing are housed the torque limiter 10. The torque limiter 10 is a mechanism for restricting torque. An inner element (not shown) which is male tapered and serration coupled to the shaft (not shown) of brushless motor 6 is mated with an outer element (not shown) which is female tapered (cup like) and serration coupled to the worm shaft (not shown) of reduction gears mechanism 11. When torque exceeding a predetermined value is exerted on the torque limiter 10, a slip will occur between the outer circumferential surface of inner element and the inner circumferential surface of outer element. In this way, the torque limiter 10 is able to control assist steering torque transmitted from the brushless motor 6 to reduction gears mechanism 11, thereby cutting off undesirably large torque. Therefore, excessive torque does not occur in the brushless motor 6 or is not transmitted downstream the torque limiter 10.

Further, the reduction gears mechanism 11 is housed in the housing. The reduction gears mechanism 11, which transmits the assist steering torque generated by brushless motor 6 to the pinion shaft 7a, is made of a worm gear mechanism. The reduction gears mechanism 11 includes a worm shaft (not shown) connected to the shaft of brushless motor 6 via the torque limiter 10, a worm gear (not shown) formed on the worm shaft and a worm wheel (not shown) connected to the pinion shaft 7a.

A signal V of vehicle speed detected by a speed sensor VS and a signal T of steering torque detected by a torque sensor TS enter the current control unit 4. The current control unit 4 determines a signal IMS for target current based upon the signals V and T, and delivers this signal IMS, based on which a current to be supplied to the brushless motor 6 is determined, to the drive control unit 5. The current control unit 4 and drive control unit 5 are electrically connected by wire harnesses WH.

A signal IMO detected by a device 12 for detection of motor current and a signal PMO detected by a device 13 for detection of motor rotation enter the drive control unit 5. A microcomputer 50 of the drive control unit 5 generates a signal VO for motor control based upon the signal IMS along with the signals IMO and PMO. A motor drive circuit 51 then imposes a motor voltage VM on the brushless motor 6 based on the signal VO (see FIGS. 2–4). The drive control unit 5, which is connected to a battery BT via fuses FS and an ignition switch IG, is supplied with battery power source (12 V). In this way, the drive control unit 5 generates a constant voltage of 5 V by transforming the battery power source of 12 V, supplying the current control unit 4 with this constant voltage.

The speed sensor VS, which detects the speed of a vehicle as a number of pulses per time, sends pulse signals corresponding to the detected number of pulses to the current control unit 4 as a signal V of vehicle speed. In this connection, the speed sensor VS may be prepared as a dedicated sensor for the apparatus 1 or another existing sensor for detection of vehicle speed may alternatively be adopted if it is available.

The torque sensor TS is a sensor of magneto striction, in which an electrical coil electromagnetically detects the effect of magneto striction caused by the steering torque manually exerted by a driver and acting on the pinion shaft 7a, including the magnitude and direction. And the torque sensor TS sends an analogue electric signal representative of detected steering torque to the current control unit 4 as a signal T of steering torque. The signal T includes the magnitude and direction of steering torque.

The device 12 for detection of motor current, which has a resistor or Hall element connected in series to the brushless motor 6, detects motor current IM actually running through the brushless motor 6. The device 12 feedbacks (negative feedback) a signal IMO of motor current to the drive control unit 5. The signal IMO is a three-phase alternating signal, including a motor current representing magnitude of actual current running through each of three phase winding of brushless motor 6 and the information on which phase of three phase winding the current runs through.

The device 13 for detection of motor rotation, which is a resolver placed at an end of brushless motor 6, detects an angle PM of motor rotation. The device 13 has a layered core rotor (not shown) secured to an end of the shaft (not shown) of brushless motor 6 and a detection element, a combination of exciting coil and detection coil (not shown), for magnetically detecting a rotational angle of the layered core rotor. The device 13 sends a signal PMO of motor rotation representative of the angle PM to the drive control unit 5. The signal PMO, which includes the direction and angle of rotation of inner rotor (not shown) of brushless motor 6, has two signals of excitation, two signals of cosine and two signals of sine.

Figure 2:
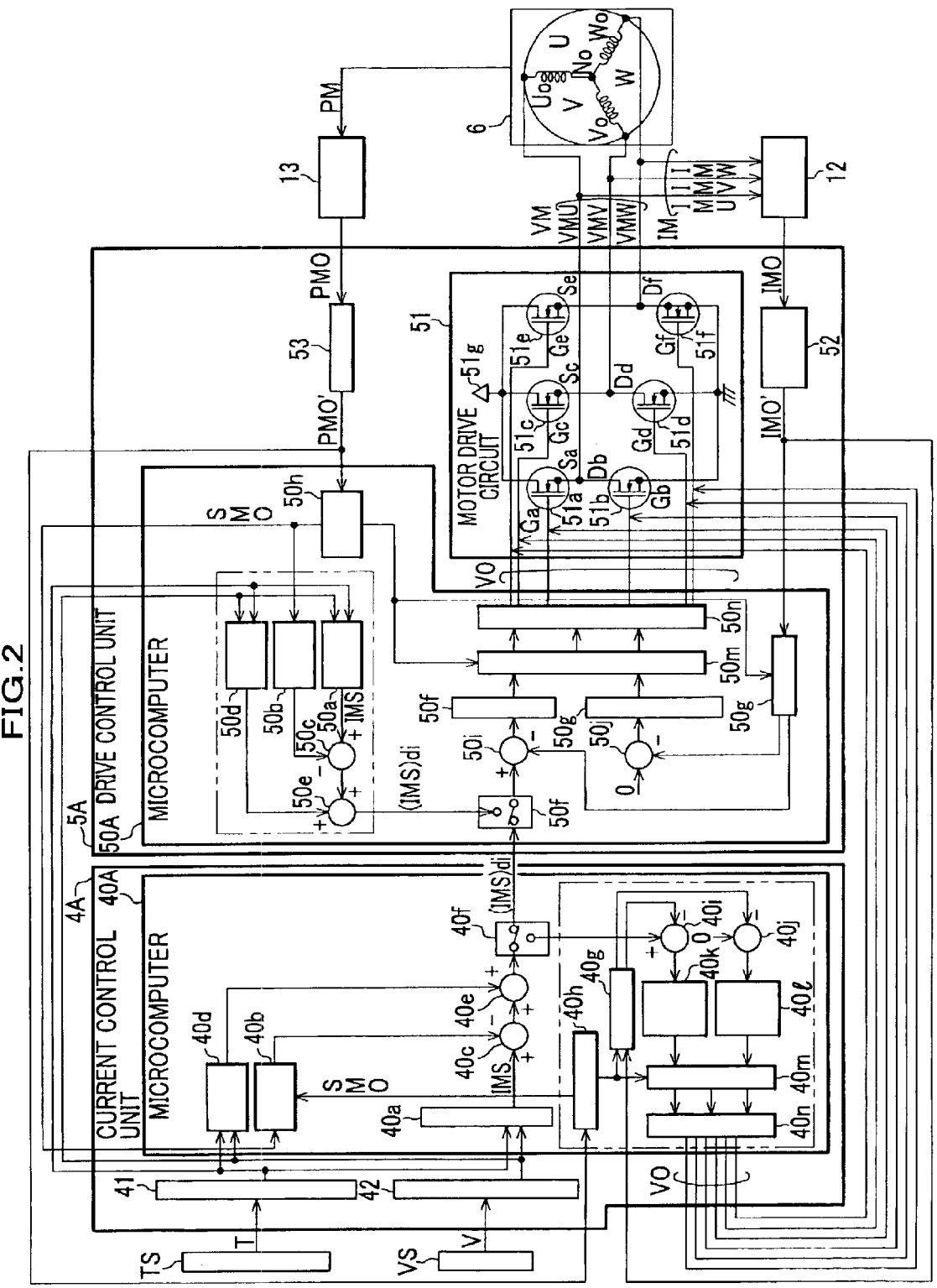
FIG. 2 is a block diagram showing current and drive control units according to the first embodiment.

A first embodiment of the present invention is described referring to FIGS. 1 and 2. FIG. 2 is a block diagram showing current control and drive control units according to the first embodiment. The object of the first embodiment is to provide an apparatus for an electric power steering system, which is able to control a brushless motor 6 using at least one of microcomputers 40A and 50A, by adopting redundant structure for the two microcomputers 40A and 50A.

A current control unit 4A according to the first embodiment is described referring to FIG. 2.

The current control unit 4A and a drive control unit 5A are electrically connected by wire harnesses WH and communicate signals therethrough (see FIG. 1). The current control unit 4A includes the microcomputer 40A made of one chip, an output circuit for signals (not shown), a memory (not shown) such as Electrically Erasable Programmable Read Only Memory (EEPROM) and a watch dog timer (not shown).

The current control unit 4A, which incorporates signals T and V from a vehicle and a speed signal SMO of motor rotation from the drive control unit 5A, determines target current to be supplied to a brushless motor 6 based upon the signals T, V and SMO. Further, the current control unit 4A incorporates a signal PMO' (digital signal) of motor rotation and a signal IMO' (digital signal) of motor current from the drive control unit 5A. If the microcomputer 50A in the drive control unit 5A fails, the current control unit 4A determines a signal VO for motor control for controlling the brushless motor 6 based upon the target current and the acquired digital signals PMO' and IMO', then sending the signal VO to a motor drive circuit 51.

The current control unit 4A monitors the operation of microcomputer 40A with a watch dog timer. The current control unit 4A thus performs self monitoring and in addition sends a signal of failure to the drive control unit 5A (microcomputer 50A) if the current control unit 4A detects the failure of microcomputer 40A with the watch dog timer. Further, the current control unit 4A sends watch dog pulses to the microcomputer 50A and checks the return of pulses sent back by the microcomputer 50A. In this way, the current control unit 4A also monitors the operation of microcomputer 50A.

I/F circuits 41 for torque sensor and 42 for speed sensor are described before starting description of the structure of microcomputer 40A.

The I/F circuit 41 receives a signal T (analogue signal) of steering torque from a torque sensor TS and converts the signal T into a signal T' (digital signal), delivering the signal T' to a device 40a for target current and a device 40d for inertia control. The I/F circuit 42 receives a signal V (pulse signal) of vehicle speed from a speed sensor VS and converts the signal V into a signal V' (digital signal), delivering the signal T' to the devices 40a and 40d. In this connection, the signals T' and V' (digital signals) are sent to the microcomputer 50A in the first embodiment but are not sent to a microcomputer 50B of the second embodiment or microcomputer 50C of the third embodiment (see FIGS. 3 and 4).

The structure of microcomputer 40A is now described. The microcomputer 40A includes a device 40a for target current, a device 40b for damper control, a device 40c for damper compensation, a device 40d for inertia control and a device 40e for inertia compensation so that the microcomputer 40A can determine a signal IMS for target current. The microcomputer 40A also includes a device 40f for failure decision so as to decide an occurrence of failure of microcomputer 50A. The microcomputer 40A further includes the following devices so as to back up microcomputer 50A, namely to determine a signal VO for motor control, if the microcomputer 50A fails: a device 40g for conversion of current, a device 40h for conversion of rotational angle, a device 40i for computation of torque deviation, a device 40j for computation of magnetic field deviation, a device 40k for torque proportional integral (PI) control, a device 40l for magnetic field PI control, a device 40m for conversion of voltage and a device 40n for conversion of pulse width modulation (PWM).

The microcomputer 40A, which generates clock signals, executes processes based upon the clock signals and performs communication with the microcomputer 50A by clock synchronization. For this purpose, the microcomputer 40A sends the clock signals to the microcomputer 50A.

When the microcomputer 50A is normal, the microcomputer 40A repeats processes for each primary process time in both the devices 40a–40e for determining a signal IMS for target current and the device 40f to decide if failure occurs in the microcomputer 50A. On the other hand if the microcomputer 40A decides that the microcomputer 50A fails, the microcomputer 40A executes additional processes for each failure process time, which is a slot of vacant time relative to the primary process time, in the devices 40g–40n for determining a signal VO for motor control. The failure process time is longer than the primary process time and the number of processes performed in the devices 40g–40n of microcomputer 40A is smaller than that performed in the microcomputer 50A while normal. In this connection, when the microcomputer 50A fails, it may be possible to set a primary process time longer than that of normal operation so that more process time can be allocated for processes in the devices 40g–40n.

The device 40a for target current is described.

The device 40a receives the signal T' (digital signal) of steering torque from the I/F circuit 41 and the signal V' (digital signal) of vehicle speed from the I/F circuit 42, delivering the signal IMS for target current to the device 40c for damper compensation. The device 40a reads out a signal IMS from a map defining the relationship between signals T' and V' vs. signal IMS, which is prepared in advance based upon experimental data or design values. This signal IMS includes the information of current to be used as a reference for determining target motor current supplied to the brushless motor 6. In this connection, a large value of signal IMS is selected for a small value of signal V' when reaction force exerted by road surface is large. On the other hand, while a vehicular is driving at high speed, a small value of signal IMS is selected for a large value of signal V' for the stability of vehicle. Also a signal IMS is so related to a signal T' that the signal IMS is set to be zero when the signal T' is around zero and increases with the signal T' after the signal T' reaches a predetermined value. A signal IMS for target current is set to be less than or equal to a maximum target current, which is derived from an allowable maximum current to be supplied to the brushless motor 6.

The device 40b for damper control is described.

The device 40b receives a speed signal SMO of motor rotation sent by the microcomputer 50A or the other signal SMO from the device 40h for conversion of rotational angle, delivering a signal for damper control to the device 40c for damper compensation. The device 40b reads out a speed signal SMO from a map defining the relationship between signal for damper control and signal SMO, which is prepared in advance based upon experimental data or design values. In order to improve the steering feeling of a driver by damping excessive assist torque, the larger a speed signal SMO is, the larger a signal for damper control is selected for. In this connection, the device 40b may incorporate a signal V' (digital signal) and determine a signal for damper control taking into account the signal V'.

The device 40c for damper compensation is described.

The device 40c receives a signal IMS for target current from the device 40a for target current and a signal for damper control from the device 40b for damper control, delivering a signal (IMS)d for target current (after damper compensation) to the device 40e for inertia compensation. The control performed by devices 40b and 40c damps excessive assist torque due to the inertia of rotational portions of a brushless motor 6 when a large amount of motor drive current IM is supplied to the brushless motor 6, thereby improving the steering feeling of a driver. The rotational speed of brushless motor 6 will not decelerate immediately due to its inertia when the brushless motor 6 rotates at high speed with a large amount of motor current IM. The object of damper control is to restrict the rotational speed of brushless motor 6. For this purpose, the device 40c subtracts a signal for damper control from a signal IMS for target current to generate a signal (IMS)d (after damper compensation).

The device 40d for inertia control is described.

The device 40d receives a signal T' (digital signal) of steering torque from the I/F circuit 41 and signal V' (digital signal) of vehicle speed form the I/F circuit 42, delivering a signal for inertia control to the device 40e for inertia compensation. The device 40d differentiates a signal T' with regard to time and delivers a time differential of signal T'. The device 40d then reads out a signal for inertia control from a map defining the relationship of time differential of steering torque and signal V' vs. signal for inertia control, which is in advance prepared based upon experimental data or design values. In order to improve the response to steering exerted by a driver, the larger a time differential is, the larger a signal for inertia control will be.

The device 40e for inertia compensation is described.

The device 40e receives a signal (IMS)d for target current (after damper compensation) from the device 40c of damper compensation and a signal for inertia control from the device 40d for inertia control, delivering a signal (IMS)di (after damper and inertia compensation) to the device 40f for failure decision. In this connection, the inertia control performed by the devices 40d and 40e prevents deterioration in the response to steering caused by the inertia of rotational portions of the brushless motor 6, thereby improving the feeling of steering by a driver. This control is required by the fact that the brushless motor 6 cannot switch the direction of rotation immediately due to the inertia when the direction of motor voltage VM is altered so as to switch the direction from a positive to reverse direction or vice versa. The inertia control therefore synchronizes a timing of switching the rotational direction of brushless motor 6 and that of switching the rotational direction of a steering wheel 3. For this purpose, the device 40e adds a signal for inertia control to a signal (IMS)d (after damper compensation) for target current, delivering a signal (IMS)di (after damper and inertia compensation).

The device 40f for failure decision is described.

The device 40f receives the signal (IMS)di for target current (after damper and inertia compensation) from the device 40e for inertia compensation, transmitting the signal (IMS)di to the microcomputer 50A or delivering the signal (IMS)di to the device 40i for torque deviation computation. When the device 40f decides that the microcomputer 50A is normal, the device 40f transmits the signal (IMS)di to the microcomputer 50A. On the other hand, when the device 40f decides that the microcomputer 50A is not normal, the device 40f commands initiation of processes executed in the devices 40g–40n as backup so as to determine a signal VO for motor control and delivers the signal (IMS)di to the device 40i. For this purpose, the device 40f decides whether or not the microcomputer 50A is normal based upon failure signals sent by the drive control unit 5A and the return of signals for watch dog pulses transmitted to the microcomputer 50A. In this connection, the device 40f decides that the microcomputer 50A fails if one of following conditions is observed: indication of the failure of microcomputer 50A by a failure signal, no return signal and a wrong return signal for a watch dog pulse.

The device 40g for current conversion is described.

The device 40g receives a signal IMO' (digital signal) of motor current transmitted by the drive control unit 5A and a phase signal of motor rotation from the device 40h for conversion of rotational angle, delivering a current signal for torque control to the device 40i for computation of torque deviation and a current signal for magnetic field control to the device 40j for computation of magnetic field deviation. The device 40g performs the same processes as those of a device 50g for current conversion in the microcomputer 50A.

The device 40h for conversion of rotational angle is described.

The device 40h receives a signal PMO' (digital signal) of motor rotation transmitted by the drive control unit 5A, delivering a phase signal of motor rotation to both the device 40g for current conversion and device 40m for voltage conversion and a speed signal SMO of motor rotation to the device 40b for damper control. The device 40h performs the same processes as those of a device 50h for conversion of rotational angle in the microcomputer 50A.

The device 40i for computation of torque deviation is described.

The device 40i receives a signal (IMS)di for target current (after damper and inertia compensation) from the device 40f for failure decision and a current signal for torque control from the 40g for current conversion, delivering a deviation signal for torque control to the device 40k for torque PI control. The device 40i performs the same processes as those of a device 50i of the microcomputer 50A.

The device 40j for computation of magnetic field deviation is described below.

The device 40j receives a current signal for magnetic field control from the device 40g for current conversion and delivers a deviation signal for magnetic field control to the device 40l for magnetic field PI control. The device 40j performs the same processes as those of a device 50j for computation of magnetic field deviation.

The device 40k for torque PI control is described.

The device 40k receives a deviation signal for torque control from the device 40i for computation of torque deviation and delivers a signal for torque PI control (direct-current voltage) to the device 40m for voltage conversion. The device 40k performs the same processes as those of a device 50k for torque PI control of the microcomputer 50A.

The device 40l for magnetic field PI control is described.

The device 40l receives a deviation signal for magnetic field control from the device 40j for computation of magnetic field deviation and delivers a signal for magnetic field PI control (direct-current voltage) to the device 40m for voltage conversion. The device 40l performs the same processes as those of a device 50l for magnetic field PI control of the microcomputer 50A.

The device 40m for voltage conversion is described.

The device 40m receives a phase signal of motor rotation from the device 40h for conversion of rotational angle, a signal (direct-current voltage) for torque PI control from the device 40k for torque PI control and a signal (direct-current voltage) for magnetic field PI control from the device 40l for magnetic field PI control, delivering a signal (three-phase alternating-current voltage) for PI control to the device 40n for PWM conversion. The device 40m performs the same processes as those of a device 50m for voltage conversion of the microcomputer 50A.

The device 40n for PWM conversion is described.

The device 40n receives a signal (three-phase direct-current voltage) for PI control from the device 40m for voltage conversion and transmits a signal VO for motor control to the motor drive circuit 51 of drive control unit 5A. The device 40n performs the same processes as those of a device 50n for PWM conversion of the microcomputer 50A.

The drive control unit 5A according to the first embodiment is described referring to FIG. 2

The drive control unit 5A communicates with the current control unit 4A via the wire harnesses WH which connect the two units electrically (see FIG. 1). The drive control unit 5A includes a microcomputer 50A of one microchip for drive control, a motor drive circuit 51, an I/F circuit 52 for motor current, a circuit for R/D conversion, an output circuit for signals (not shown), a memory (not shown) such as EEPROM for storing data used by the microcomputer 50A and a watch dog timer (not shown).

The drive control unit 5A incorporates signals IMO and PMO from a vehicle and a signal (IMS)di for target current (after damper and inertia compensation) from the current control unit 4A, delivering a signal VO for motor control, which is determined based upon the signals IMO, PMO and (IMS)di, to the motor drive circuit 51 in order to drive the brushless motor 6. Further, the microcomputer 50A incorporates signals T' (digital signal) of steering torque and V' (digital signal) of vehicle speed from the current control unit 4A. In this way, if the microcomputer 40A fails, the microcomputer 50A determines a target current to be supplied to the brushless motor 6 based upon a speed signal SMO of motor rotation in addition to the incorporated signals T' and V'.

The drive control unit 5A monitors the microcomputer 50A by a watch dog timer. In addition to self monitoring, if the drive control unit 5A detects the abnormal operation (failure) of microcomputer 50A, the drive control unit 5A transmits failure signals to the current control unit 4A (microcomputer 40A). Further, the drive control unit 5A, which transmits watch dog pulses to the microcomputer 40A and monitors return pulses sent back by the microcomputer 40A, performs mutual monitoring for the microcomputer 40A.

Before description of the micro computer 50A, the I/F circuit 52 for motor current and circuit 53 for R/D conversion are described.

The I/F circuit 52 receives a signal IMO (analogue signal) of motor current from the device 12 for detection of motor current and converts the signal IMO to a signal IMO' (digital signal), delivering the signal IMO' to the microcomputer 50A. On the other hand, the circuit 53 receives a signal PMO (analogue signal) of motor rotation from the device 13 for detection of motor rotation, delivering a signal PMO' (digital signal) of motor rotation to the microcomputer 50A. The circuit 53 converts the analogue signal PMO of motor rotation into the digital signal PMO' with computation of the direction and angle of rotation. In this connection, the signals (digital signals) IMO' and PMO' are transmitted to the microcomputer 40A in the first embodiment, but not transmitted to the microcomputers 40B or 40C in the second or third embodiment (see FIGS. 3 and 4).

The microcomputer 50A for drive control is described.

The microcomputer 50A includes a device 50*f* for failure decision in order to decide an occurrence of failure in the microcomputer 40A. The microcomputer 50A also includes a device 50*g* for current conversion, a device 50*h* for conversion of rotational angle, a device 50*i* for computation of torque deviation, a device 50*j* for computation of magnetic field deviation, a device 50*k* for torque PI control, a device 50*l* for magnetic field PI control, a device 50*m* for voltage conversion and a device 50*n* for PWM conversion so as to determine a signal VO for motor control. The microcomputer 50A further includes a device 50*a* for target current, a device 50*b* for damper control, a device 50*c* for damper compensation, a device 50*d* for inertia control and a device 50*e* for inertia compensation so that the microcomputer 50A can back up the microcomputer 40A, namely determine a signal (IMS)di for target current (after damper and inertia compensation) when the microcomputer 40A fails.

The microcomputer 50A, which generates clock signals, executes processes based upon the signals. The microcomputer 50A communicates with the microcomputer 40A by clock synchronization using the clock signals transmitted by the microcomputer 40A.

When the microcomputer 40A is normal, the microcomputer 50A repeats processes in both the devices 50*g*–50*n* for each primary process time for determining a signal VO for motor control and the device 50*f* to decide if failure occurs in the microcomputer 40A. On the other hand when the microcomputer 40A fails, the microcomputer 50A repeats other additional processes for each failure process time, which is a slot of vacant time relative to the primary process time, in the devices 50*a*–50*e* for determining a signal (IMS)di for target current (after damper and inertia compensation). The failure process time is longer than the primary process time and the number of processes performed in the devices 50*a*–50*e* of microcomputer 50A is smaller than that performed in the microcomputer 40A while normal. In this connection, when the microcomputer 40A fails, it may be possible to set a primary process time longer than that of normal operation so that more process time can be allocated for processes in the devices 50*a*–50*e*.

The device 50*f* for failure decision is described.

The device 50*f* receives a signal (IMS)di for target current (after damper and inertia compensation) transmitted by the microcomputer 40A or the other signal (IMS)di from the device 50*e* for inertia compensation, and delivers either of the signals (IMS)di to the device 50*i* for torque deviation computation. If the device 50*f* decides that the microcomputer 40A is normal, the device 50*f* delivers a signal (IMS)di transmitted by the microcomputer 40A to the device 50*i*. On the other hand, if the device 50*f* decides that the microcomputer 40A fails, the device 50*f* commands initiation of processes in the devices 50*a*–50*e* so as to determine a signal (IMS)di and delivers the signal (IMS)di to the device 50*f*. For this purpose, the device 50*f* decides whether or not the microcomputer 40A is normal based upon failure signals sent by the current control unit 4A and the return of signals for watch dog pulses transmitted to the microcomputer 40A. In this connection, the device 50*f* decides that the microcomputer 40A fails if one of the following conditions is observed: indication of the failure of microcomputer 40A by a failure signal, no return signal or a wrong return signal for a watch dog pulse.

The device 50*g* for current conversion is described.

The device 50*g* receives a signal IMO' (digital signal) of motor current from the I/F circuit 52 for motor current and a phase signal of motor rotation from the device 50*h* for conversion of rotational angle, delivering a current signal for torque control to the device 50*i* for compensation of torque deviation and a current signal for magnetic field control to the device 50*j* for compensation of magnetic field deviation. The device 50*g* determines a current signal for torque control by sampling a current component, which generates the rotational torque of brushless motor 6, from the motor current based upon a signal IMO of motor current of three-phase alternating current, a phase signal of motor rotation and the like. The device 50*g* also determines a current signal for magnetic field control by sampling a current component which generates the magnetic field of brushless motor 6 in the same manner as that of the current signal for torque control described above.

The device 50*h* for conversion of rotational angle is described.

The device 50*h* receives a signal PMO' (digital signal) of motor rotation from the circuit 53 for R/D conversion and delivers a phase signal of motor rotation to the devices 50*g* for current conversion and 50*m* for voltage conversion. In addition the device 50*h* transmits a speed signal SMO of motor rotation to the microcomputer 40A and delivers the speed signal SMO to the device 50*b* for damper control. The device 50*h* computes a rotational speed of the brushless motor 6 based upon an angle and direction of the signal PMO', thereby determining a speed signal SMO of motor rotation. The device 50*h* computes an accurate phase of rotation based upon an angle, direction and speed of signal PMO' taking into account an angle of advance, thereby determining a phase signal of motor rotation.

The device 50*i* for computation of torque deviation is described.

The device 50*i* receives a signal (IMS)di for target current (after damper and inertia compensation) from the device 50*f* for failure decision and a current signal for torque control from the device 50*g* for current conversion, delivering a deviation signal for torque control to the device 50*k* for torque PI control. The device 50*i* subtracts the signal for torque control from the signal (IMS)di, determining a deviation signal for torque control.

The device 50*j* for computation of magnetic field deviation is described.

The device 50*j* receives a current signal for magnetic field control from the device 50*g* for current conversion and delivers a deviation signal for magnetic field control to the device 50*l* for magnetic field PI control. The device 50*j* subtracts the current signal for magnetic field control from zero, determining a deviation signal for magnetic field control.

The device 50*k* for torque PI control is described.

The device 50*k* receives a deviation signal for torque control from the device 50*i* for computation of torque deviation and delivers a signal for torque PI control (direct-current voltage) to the device 50*m* for voltage conversion. The device 50*k* performs control of P (proportion) and I (integration) for the deviation signal. The device 50*k* then determines a voltage (direct-current component) of motor to be imposed on the brushless motor 6 and the signal for torque PI control which indicates the direction of brushless motor 6 so that the deviation for torque control can be made close to zero.

The device 50*l* for magnetic field PI control is described.

The device 50*l* receives a deviation signal for magnetic field control from the device 50*j* for computation of magnetic field deviation and delivers a signal for magnetic field PI control (direct-current voltage) to the device 50*m* for voltage conversion. The device 50*l* performs control of P (proportion) and I (integration) for the deviation signal. The device 50*l* then determines a voltage (direct-current component) for motor to be imposed on the brushless motor 6 and the signal for magnetic field PI control which indicates the direction of brushless motor 6 so that the deviation for magnetic field control can be made close to zero.

The device 50*m* for voltage conversion is described.

The device 50*m* receives a phase signal of motor rotation from the device 50*h* for conversion of rotational angle, a signal (direct-current voltage) for torque PI control from the device 50*k* for torque PI control and a signal (direct-current voltage) for magnetic field PI control from the device 50*l* for magnetic field PI control, delivering a signal (three-phase alternating-current voltage) for PI control to the device 50*n* for PWM conversion. The device 50*m* determines on which phase of winding of the three phases (U, V and W phases) a motor voltage should be imposed based upon the phase signal of motor rotation. The device 50*m* then determines the signal for PI control made of components of three-phase alternating current, U, V and W phase voltages based upon the signals for torque and magnetic field PI control.

The device 50*n* for PWM conversion is described.

The device 50*n* receives a signal (three-phase direct-current voltage) for PI control from the device 50*m* for voltage conversion and delivers a signal VO for motor control to the motor drive circuit 51. The device 50*n* generates a value for motor current IM to be supplied to the brushless motor 6 and PWM signals corresponding to respective phases of U, V and W or an OFF signal for each one of FET51*a*–51*f* of the motor drive circuit 51 based upon the signal for PI control. The device 50*n* specifies one of FET51*a*–51*f* to which the device 50*n* should supply a PWM signal based upon the signal for PI control including the information about the winding to be imposed voltage, thereby determining a duty ratio for PWM signals.

The brushless motor 6 has a three-phase winding of U, V and W phases. When a motor voltage VM, which has VMU of U phase voltage, VMV of V phase voltage and VMW of W phase voltage, is imposed on terminals U0, V0 and W0, respectively, the three-phase winding of brushless motor 6 is supplied with current in an order of phase. In this way, the inner rotor (not shown) rotates. The brushless motor 6 rotates in a positive direction while supplied with current in a forward order of U phase→V phase→W phase or in a reverse direction while supplied with current in a backward order of W phase→V phase→U phase. The devices 50*k* and 50*l* for torque and magnetic field PI control determine a direction of rotation of the brushless motor 6 and voltage for each phase of three-phase winding. The device 50*m* for voltage conversion determines a phase of three-phase winding to which the current is supplied based upon a phase signal of motor rotation.

The device 50*a* for target current is described.

The device 50*a* receives signal T' (digital signal) of steering torque and signal V' (digital signal) of vehicle speed both transmitted by the current control unit 4A, delivering a signal IMS for target current to the device 50*c* for damper control. The device 50*a* performs the same processes as those of the device 40*a* of microcomputer 40A.

The device 50*b* for damper control is described.

The device 50*b* receives a speed signal SMO of motor rotation from the device 50*h* for conversion of rotational angle and delivers a signal for damper control to the device 50*c* for damper compensation. The device 50*b* performs the same processes as those of device 40*b* of microcomputer 40A.

The device 50*c* for damper compensation is described.

The device 50*c* receives the signal IMS for target current from the device 50*a* for target current and a signal for damper control from the device 50*b* for damper control, delivering a signal (IMS)d for target current (after damper compensation) to the device 50*e* for inertia compensation. The device 50*c* performs the same processes as those of the device 40*c* of microcomputer 40A.

The device 50*d* for inertia control is described.

The device 50*d* receives a signal T' (digital signal) and signal V' (digital signal) both transmitted by the current control unit 4A, delivering a signal for inertia control to the device 50*e* for inertia compensation. The device 50*d* performs the same processes as those of the device 40*d* of microcomputer 40A.

The device 50*e* for inertia compensation is described.

The device 50*e* receives a signal (IMS)d for target current (after damper compensation) from the device 50*c* for damper compensation and a signal for inertia control from the device 50*d* for inertia control, delivering a signal (IMS)di for target current (after damper and inertia compensation) to the device 50*f* for failure decision. The device 50*e* performs the same processes as those of the device 40*e* of microcomputer 40A.

The unit 51 for motor drive is described.

The unit 51 receives a signal VO for motor control from the microcomputer 50A or the other signal VO transmitted by the microcomputer 40A in case of the failure of microcomputer 50A, imposing a voltage VM of motor on the brushless motor 6. Therefore, the unit 51, which has a bridge circuit made of FET51*a*–51*f*, is supplied with a voltage of 12

V by a power source 51g. In the unit 51, the terminals of brushless motor are connected to the FET in the following manner: a terminal U0 of the brushless motor 6 is connected to a connection between a source Sa of FET51a and a drain Db of FET 51b, a terminal V0 to a connection between a source Sc of FET51c and a drain Dd of FET51d and W0 to a connection between a source Se of FET51e and a drain Df of FET51f. FET 51a–51f, which are supplied with a PWM signal or OFF signal through gates Ga–Gf respectively, are turned on when FET 51a–51f receive a PWM signal which has a logical level of one. In this connection, a motor voltage VM imposed on the brushless motor 6 is determined based upon a duty ratio of PWM signal of an FET which is selectively PWM driven.

(1) First Embodiment

The operation of current control unit 4A and drive control unit 5A according to a first embodiment is described referring to FIGS. 1 and 2. Description will be made for three cases assuming that both microcomputers 40A and 50A operate normally and either of the two fails.

First, description is made for a case where both microcomputers 40A and 50A are normal.

The microcomputer 40A determines a signal IMS for target current based upon a signal T' (digital signal) of steering torque and signal V' (digital signal) of vehicle speed. The microcomputer 40A also makes damper and inertia compensation for the signal IMS based upon the signals T' and V' along with a speed signal SMO of motor rotation.

The microcomputer 40A judges that the microcomputer 50A is normal using failure signals transmitted by the drive control unit 5A or return signals transmitted by the microcomputer 50A for watch dog pulses generated by the microcomputer 40A. The microcomputer 40A transmits a signal (IMS)di for target current (after damper and inertia compensation) to the drive control unit 5A (microcomputer 50A). In this case, the microcomputer does not perform processes in the devices 40g–40n.

On the other hand, the microcomputer 50A judges that the microcomputer 40A is normal using failure signals transmitted by the current control unit 4A or return signals transmitted by the microcomputer 40A for watch dog pulses generated by the microcomputer 50A. In this case, the microcomputer 50A uses a signal (IMS)di for target current (after damper and inertia compensation) transmitted by the microcomputer 40A. The microcomputer 50A thus does not perform processes in the devices 50a–50e.

The microcomputer 50A determines a signal VO for motor control based upon a signal (IMS)di, a signal IMO' (digital signal) of motor current and a signal PMO' (digital signal) of motor rotation for each primary process time.

The motor drive circuit 51 performs selective PWM drive for FET51a–51f, thereby imposing a motor voltage VM (VMU of U phase voltage, VMV of V phase voltage and VMW of W phase voltage) on a terminal U0, V0 or W0 of the brushless motor 6, respectively. The motor drive circuit 51 sequentially changes FET51a–51f to be selectively driven and also controls the motor voltage VM so that the brushless motor 6 can be driven in a positive or reverse direction depending on the signal VO.

When a motor voltage VM is imposed on one of the winding of brushless motor 6, U phase, V phase or W phase, a motor current IM (IMU of U phase current, IMV of V phase current and IMW of W phase current) runs through the brushless motor 6. An inner rotor (not shown) then is driven in a positive or reverse direction and thereby a motor shaft (not shown) rotates accordingly. The device 12 for detection of motor current detects the motor current IM and transmits a signal IMO of motor current to the drive control unit 5A. The device 13 for detection of motor rotation detects an angle PM of motor rotation of the inner rotor (not shown) and transmits a signal PMO of motor rotation to the drive control unit 5A.

The drive torque of motor shaft (not shown) of brushless motor 6 is transmitted to a pinion shaft 7a via a torque limiter 10 and reduction gears mechanism 11. Then this drive torque acts on the pinion shaft 7a as assist torque, thereby assisting the steering torque exerted by a driver and improving steering thereof.

Next, description is made for a case where the microcomputer 50A fails.

The microcomputer 40A determines a signal IMS for target current based upon a signal T' (digital signal) of steering torque and signal V' (digital signal) of vehicle speed. The microcomputer 40A also makes damper and inertia compensation for the signal IMS based upon the signals T' and V' along with a speed signal SMO of motor rotation delivered by the microcomputer 50A.

The microcomputer 40A judges that the microcomputer 50A is not normal using failure signals transmitted by the drive control unit 5A or return signals transmitted by the microcomputer 50A for watch dog pulses generated by the microcomputer 40A. And in order to back up the microcomputer 50A, the microcomputer 40A determines a signal VO for motor control for each failure process time based upon a signal (IMS)di for target current (after damper and inertia compensation) along with a signal IMO' (digital signal) of motor current and signal PMO' (digital signal) of motor rotation transmitted by the drive control unit 5A, transmitting the signal VO to the motor drive circuit 51 of drive control unit 5A.

Since the microcomputer 50A is not able to determine a signal VO for motor control due to failure, the microcomputer 50A does not deliver the signal VO to the motor drive circuit 51.

However, the motor drive circuit 51 imposes a motor voltage VM on the brushless motor 6 based upon a signal VO for motor control transmitted by the microcomputer 40A in the same manner as that described above. In this way, the brushless motor 6 is driven in a positive or reverse direction to generate drive torque. The drive torque then acts on a steering system as assist torque, thereby assisting the steering torque exerted by a driver and improving steering thereof.

Description is made for a case where the microcomputer 40A is not normal.

In this case, the microcomputer 40A is not able to determine a signal IMS for target current due to failure. Consequently, the microcomputer 40A does not deliver the signal IMS to the microcomputer 50A.

The microcomputer 50A judges that the microcomputer 40A is not normal using failure signals transmitted by the current control unit 4A or return signals transmitted by the microcomputer 40A for watch dog pulses generated by the microcomputer 50A. In order to back up the microcomputer 40A, the microcomputer 50A determines a signal IMS for target current for each failure process time based upon a signal T' (digital signal) of steering torque and signal V' (digital signal) of vehicle speed. The microcomputer 50A further performs damper and inertia compensation for the signal IMS based upon the signals T' and V' transmitted by the current control unit 4A along with a speed signal SMO of motor rotation.

The microcomputer 50A determines a signal VO for motor control for each primary process time based upon a signal (IMS)di for target current (after damper and inertia compensation) generated inside the microcomputer 50A, along with a signal IMO' (digital signal) of motor current and signal PMO' (digital signal) of motor rotation.

Then, the motor drive circuit 51 imposes a motor voltage VM on the brushless motor 6 in the same manner as that described before based upon the signal VO determined by the microcomputer 50A. In this way, the brushless motor 6 is driven in a positive or reverse direction to generate drive torque. The drive torque then acts on a steering system as assist torque, thereby assisting the steering torque exerted by a driver and improving steering thereof.

According to the first embodiment, even if the microcomputer 50A fails, the microcomputer 40A detects the failure and takes over the microcomputer 50A functionally, thereby continuing to exert assist torque on a steering line S. When the microcomputer 40A fails, the microcomputer 50A takes over the microcomputer 40A in the same manner. In this way, the apparatus 1 for controlling an electric power steering system provides a failsafe system which makes it feasible for assist torque to act on the steering torque exerted by a driver without intermittence even if one of the microcomputers 40A and 50A fails. Further, since backup processes during failure are performed by the microcomputers 40A and 50A utilizing slots of vacant time, the apparatus 1 according to the present invention does not require upgrading of the microcomputers 40A and 50A.

(2) Second Embodiment

Figure 3:
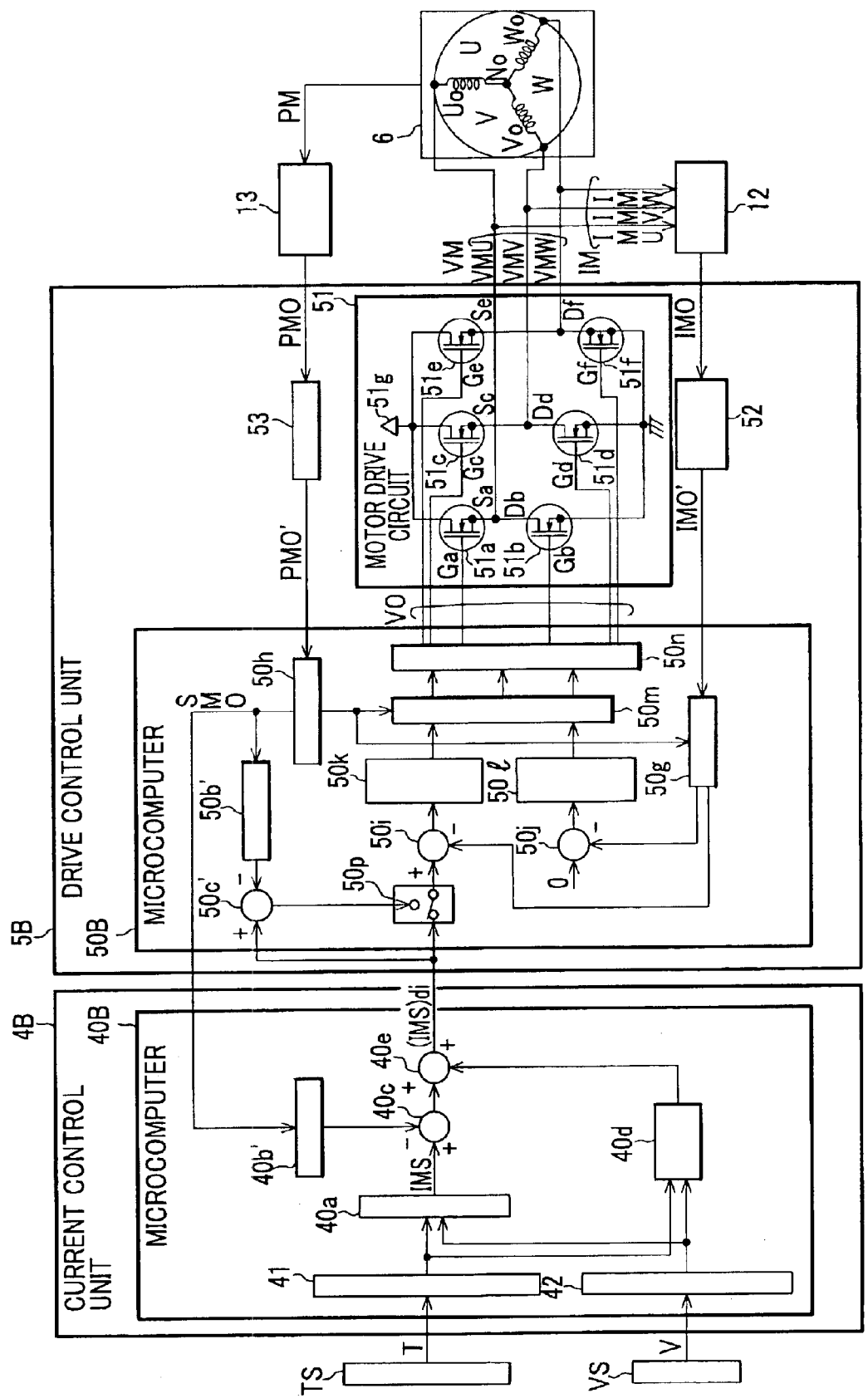
FIG. 3 is a block diagram showing current and drive control units according to the second embodiment.

A second embodiment is described referring to FIGS. 1 and 3. Description will be omitted for the items shown in the second embodiment which are same as those in the first embodiment, bearing the same symbols.

FIG. 3 is a block diagram showing a current control unit and drive control unit according to the second embodiment. Compared with the first embodiment, the level of redundancy between microcomputers 40B and 50B is simplified. The microcomputer 40B of a current control unit 4B, which performs damper compensation based upon a speed signal SMO of motor rotation transmitted by the microcomputer 50B, fails to perform damper control if the microcomputer 40B is not able to receive the speed signal SMO from the microcomputer 50B. If damper compensation is not performed, assist torque is given as a result of incorporating an abrupt steering through a steering wheel 3, vibration or rapidly fluctuating reaction force stemming from steered wheels W, into driving of a brushless motor 6. In this way, the steering feeling of a driver is deteriorated. Therefore, the microcomputer 50B according to the second embodiment is arranged so that the microcomputer 50B can perform damper compensation for a signal IMS for target current even if the microcomputer 40B is not able to perform damper compensation due to the failure in reception of a speed signal SMO of motor rotation.

A current control unit 4B according to the second embodiment is described referring to FIG. 3.

The current control unit 4B and a drive control unit 5B are electrically connected by wire harnesses WH and communicate signals therethrough (see FIG. 1). The current control unit 4B includes a microcomputer 40B made of one chip having an I/F circuit 41 for a torque sensor and I/F circuit 42 for a speed sensor, an output circuit for signals (not shown), a memory (not shown) such as EEPROM for storing data used by the microcomputer 40B and a watch dog timer (not shown).

The current control unit 4B incorporates signals T and V from a vehicle and a speed signal SMO of motor rotation from the drive control unit 5B, determining a target current to be supplied to a brushless motor 6 based upon the signals T, V and SMO.

The microcomputer 40B is described.

The microcomputer 40B has a device 40a for target current, a device 40b' for damper control, a device 40c for damper compensation, a device 40d for inertia control and a device 40e for inertia compensation.

The microcomputer 40B, which generates clock signals, executes processes based upon the clock signals and performs communication with the microcomputer 50B by clock synchronization. For this purpose, the microcomputer 40B transmits the clock signals to the microcomputer 50B.

The microcomputer 40B judges whether or not it receives signals (typically a speed signal SMO of motor rotation) normally from the microcomputer 50B with techniques such as verify check and sum check for the signals. Or the microcomputer 40B uses a technique for health check by monitoring whether or not the microcomputer 40B can receive signals from the microcomputer 50B within a predetermined period time, which is longer by a predetermined time than a specified interval of signal reception. The microcomputer 40B, which judges the status of signal reception, normal or abnormal, for signals transmitted by the microcomputer 50B, transmits signals reporting reception status to the microcomputer 50B. In this connection, following are possibly named as causes for the failure of signal reception: disconnection of communication lines, effect of noise on communication lines, failure of a circuit generating signals such as a speed signal SMO of motor rotation and failure of means for detection such as a device 13 for detection of motor rotation.

When the microcomputer 40B receives a speed signal SMO of motor rotation normally, the microcomputer 40B executes processes in the devices 40a, 40b', 40c, 40d and 40e for each primary process time so as to determine a signal IMS for target current. The microcomputer 40B performs damper and inertia compensation for the signal IMS, which the microcomputer 40B then transmits to the microcomputer 50B as a signal (IMS)di for target current (after damper and inertia compensation). On the other hand, when the microcomputer 40B does not receive the speed signal SMO normally, the microcomputer 40B does not execute damper control for a signal IMS for target current, executing other processes in the devices 40a, 40b', 40c, 40d and 40e for each primary process time. In this way the microcomputer 40B transmits a signal for target current (IMS)i (after inertia compensation only) to the microcomputer 50B.

The device 40b' for damper control is described.

The device 40b' receives a speed signal SMO of motor rotation transmitted by the microcomputer 50B and delivers a signal for damper control to the device 40c for damper compensation. When the device 40b' receives the speed signal SMO normally, the device 40b' reads out a signal for damper control from the data defining the relationship of speed signal SMO vs. signal for damper control, which is prepared in advance based upon experimental or design data. On the other hand, when the device 40b' does not receive the speed signal SMO normally, the device 40b' sets zero for a signal for damper control.

The drive control unit 5B according to the second embodiment is described referring to FIG. 3.

The drive control unit 5B and the current control unit 4B are electrically connected by wire harnesses WH and communicate signals therethrough (see FIG. 1). The drive control unit 5B includes a microcomputer 50B of one microchip for drive control, a motor drive circuit 51, an I/F circuit 52 for motor current, a circuit 53 for R/D conversion, an output circuit for signals (not shown), a memory (not shown) such as EEPROM for storing data used by the microcomputer 50B and a watch dog timer (not shown).

The drive control unit 5B incorporates signals IMO and PMO from a vehicle and a signal (IMS)di for target current (after damper and inertia compensation) from the current control unit 4B, and generates a signal VO for motor control, which is determined based upon the signals IMO, PMO and (IMS)di, delivering the signal VO to the motor drive circuit 51 in order to drive a brushless motor 6. Further, when the microcomputer 40B of current control unit 4B is not able to receive a speed signal SMO of motor rotation normally, the drive control unit 5B performs damper control for a signal (IMS)i for target current (after inertia compensation) based upon a speed signal SMO of motor rotation.

The microcomputer 50B is described.

The microcomputer 50B includes a device 50g for current conversion, a device 50h for conversion of rotational angle, a device 50i for computation of torque deviation, a device 50j for computation of magnetic field deviation, a device 50k for torque PI control, a device 50l for magnetic field PI control, a device 50m for voltage conversion and a device 50n for PWM conversion so as to determine a signal VO for motor control. The microcomputer 50B also includes a device 50p for decision of compensation in order to judge if damper compensation is made for a signal IMS for target current, and further a device 50b' for damper control and a device 50c' for damper compensation for performing damper compensation for the signal IMS.

The microcomputer 50B, which generates clock signals, executes processes based upon the signals. The microcomputer 50B communicates with the microcomputer 40B by clock synchronization using the clock signals transmitted by the microcomputer 40B.

When the microcomputer 40B receives a speed signal SMO of motor rotation normally, the microcomputer 50B repeats processes for each primary process time in both the devices 50g–50n for determining a signal VO for motor control and the device 50p to decide if damper compensation is made for a signal IMS of motor target current. On the other hand when the microcomputer 40B fails to receive a speed signal SMO of motor rotation, the microcomputer 50B performs for each primary process time the same processes described above. In addition, the microcomputer 50B repeats other processes for each failure process time, which is a slot of vacant time relative to the primary process time, in the devices 50b' and 50c' for performing damper compensation for a signal (IMS)i for target current (after inertia compensation). The failure process time is longer than the primary process time and the number of processes per time performed in the devices 50b' and 50c' of microcomputer 50B is smaller than that performed in the microcomputer 40B while normal. In this connection, if the processes in the devices 50b' and 50c' are not considered to be a large load for the microcomputer 50B, it may be possible to perform these processes for each primary process time.

The device 50i for torque compensation is described.

The device 50i is same as that of the first embodiment (see FIG. 2) except for signal reception that a signal (IMS)di for target current (after damper and inertia compensation) enters the device 50i from the device 50p.

The device 50p for decision of compensation is described.

The device 50p receives a signal (IMS)di for target current (after damper and inertia compensation) transmitted by the microcomputer 40B or the other (IMS)di from the device 50c' for damper compensation, delivering either of the signals (IMS)di to the device 50i for compensation of torque deviation. When the device 50p judges that the microcomputer 40B receives a speed signal SMO of motor rotation normally (damper compensation is performed for a signal IMS), the device 50p delivers the signal (IMS)di transmitted by the microcomputer 40B to the device 50i. On the other hand, when the device 50p judges that the microcomputer 40B fails to receive a speed signal SMO (damper compensation is not performed for a signal IMS), the device 50p commands execution of processes in the devices 50b' and 50c' so as to perform damper compensation for a signal (IMS)i of target current (after inertia compensation), delivering a signal (IMS)di (after damper and inertia compensation) to the device 50i. For this purpose, the device 50p judges whether or not the microcomputer 40B receives a speed signal SMO of motor rotation based upon signals of reception status transmitted by the microcomputer 40B.

The device 50b' for damper control is described.

The device 50b' receives a speed signal SMO of motor rotation from the device 50h for conversion of rotational angle and delivers a signal for damper control to the device 50c' for damper compensation.

The device 50c' for damper compensation is described.

The device 50c' receives a signal (IMS)i for target current (after inertia compensation) transmitted by the microcomputer 40B and a signal for damper control from the device 50b' for damper control, delivering a signal (IMS)di of target current (after damper and inertia compensation) to the device 50p for decision of compensation. The device 50c' computes a signal (IMS)di by subtracting a signal for damper control from a signal (IMS)i.

The operation of current control unit 4B and drive control unit 5B according to the second embodiment is described referring to FIGS. 1 and 3. Descriptions are made for the two cases where the microcomputer 40B receives a speed signal SMO of motor rotation normally and the microcomputer 40B fails to do so.

First, description is made for a case where the microcomputer 40B receives a speed signal SMO of motor rotation normally.

The microcomputer 40B determines a signal IMS for target current based upon a signal T' (digital signal) of steering torque and signal V' (digital signal) of vehicle speed. The microcomputer 40B also makes damper and inertia compensation for the signal IMS based upon the signals T' and V' along with a speed signal SMO of motor rotation.

On the other hand, the microcomputer 50B judges that the microcomputer 40B receives a speed signal SMO of motor rotation normally using signals of reception status transmitted by the microcomputer 40B. In this case, the microcomputer 50B delivers a signal (IMS)di for target current (after damper and inertia compensation) transmitted by the microcomputer 40B to the device 50i for computation of torque deviation. In this connection, the microcomputer 50B does not execute processes in the devices 50b' and 50c'.

The microcomputer 50B determines a signal VO for motor control based upon the signal (IMS)di, a signal IMO' (digital signal) of motor current and a signal PMO' (digital signal) of motor rotation for each primary process time.

Then, the motor drive circuit 51 imposes a motor voltage VM on a brushless motor 6 in the same manner as that described in the first embodiment based upon the signal VO for motor control. In this way, the brushless motor 6 is driven in a positive or reverse direction to generate drive torque. The drive torque then acts on a steering line as assist torque, thereby assisting the steering torque exerted by a driver and improving steering thereof.

Next description is made for a case where the microcomputer 40B fails to receive a speed signal SMO of motor rotation.

The microcomputer 40B determines a signal IMS for target current based upon a signal T' (digital signal) of steering torque and signal V' (digital signal) of vehicle speed. The microcomputer 40B also makes inertia compensation for the signal IMS based upon the signals T' and V'. However, the microcomputer 40B does not receive a speed signal SMO of motor rotation normally, thereby being unable to make damper compensation for the signal IMS.

The microcomputer 50B judges that the microcomputer 40B fails to receive a speed signal SMO of motor rotation using signals of reception status transmitted by the microcomputer 40B, executing processes in the devices 50b' and 50c' so as to make damper compensation for a signal IMS for target current. The microcomputer 50B generates a signal for damper control for each failure process time based upon a speed signal SMO of motor rotation, thereby making damper compensation for a signal (IMS)i (after inertia compensation) transmitted by the microcomputer 40B.

The microcomputer 50B then determines a signal VO for motor control for each primary process time based upon a signal (IMS)di of target current (after damper and inertia compensation) delivered by the device 50c' along with a signal IMO' (digital signal) of motor current and a signal PMO' (digital signal) of motor rotation.

Then, the motor drive circuit 51 imposes a motor voltage VM on a brushless motor 6 in the same manner as that described in the first embodiment based upon the signal VO for motor control. In this way, the brushless motor 6 drives in a positive or reverse direction to generate drive torque. The drive torque then acts on a steering line as assist torque, thereby assisting the steering torque exerted by a driver and improving steering thereof.

According to the second embodiment, even if the microcomputer 40B is not able to receive a speed signal SMO of motor rotation normally, the microcomputer 50B is able to make damper compensation based upon another speed signal SMO which the microcomputer 50B incorporates directly, thereby continuing to exert appropriate assist torque to achieve excellent feeling of steering. In other words, even if the microcomputer 40B is not able to perform damper control, the microcomputer 50B takes over damper control, thereby continuing excellent feeling of steering. Further, since the microcomputer 50B can execute damper control using slots of vacant time relative to normal process, it is not necessary to upgrade the microcomputer 50B in terms of throughput per unit time.

(3) Third Embodiment

Figure 4:
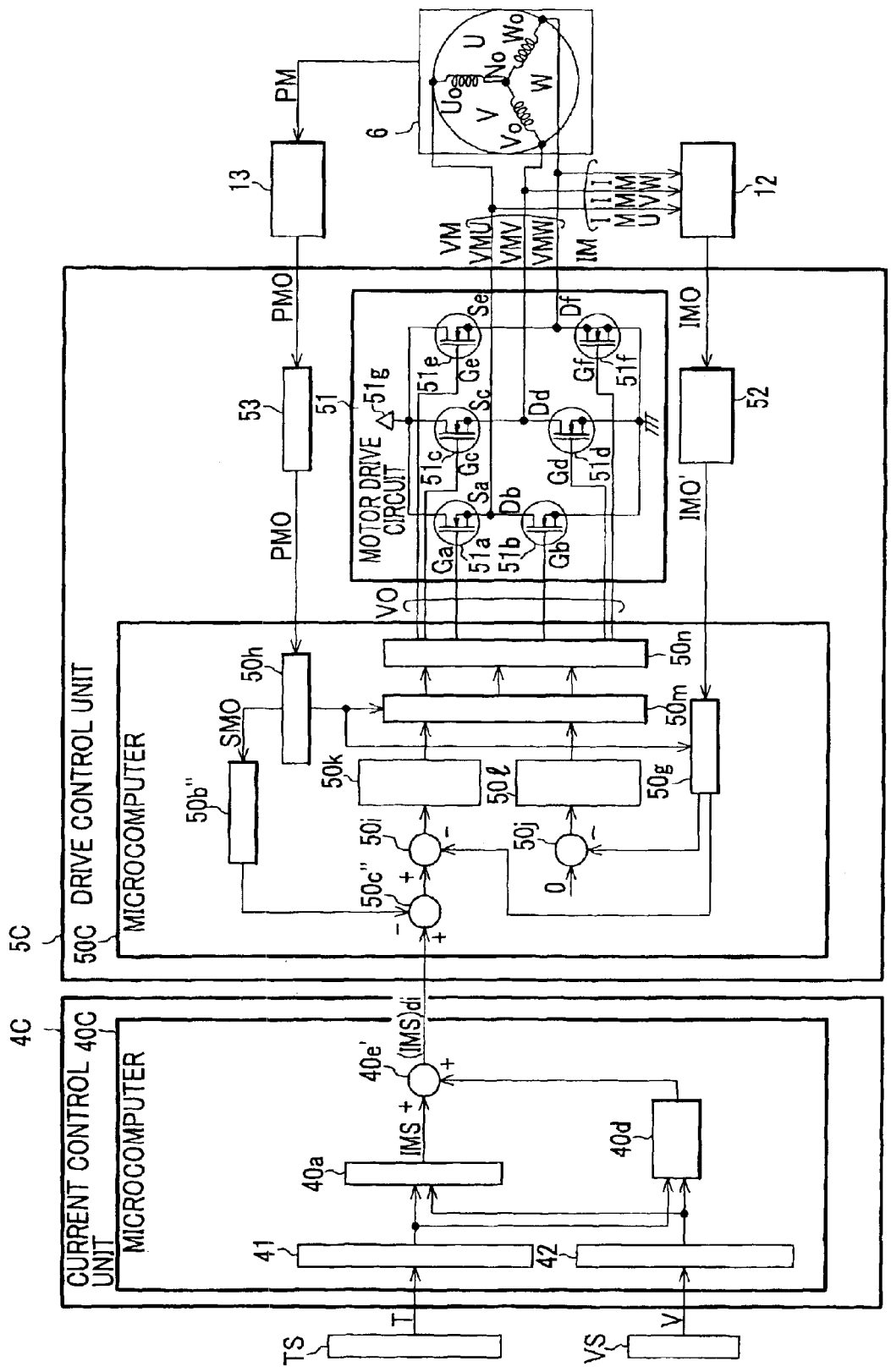
FIG. 4 is a block diagram showing current and drive control units according to the third embodiment.

A third embodiment of the present invention is described referring to FIGS. 1 and 4. FIG. 4 is a block diagram showing a current control unit and drive control unit according to the third embodiment. The items described in the third embodiment, which are same as those in the first embodiment, would be omitted bearing the same symbols.

Compared with the second embodiment, the level of redundancy between microcomputers 40C and 50C is further simplified. If the microcomputer 40C is so arranged that it requires a speed signal SMO of motor rotation transmitted by the microcomputer 50C for damper control, the microcomputer 40C is not able to execute damper compensation when the microcomputer 40C fails to receive the speed signal SMO. Therefore in the third embodiment, the microcomputer 50C, which generates a speed signal SMO of motor rotation therein, executes damper control instead of the microcomputer 40C.

The structure of current control unit 4C according to the third embodiment is described referring to FIG. 4.

The current control unit 4C and a drive control unit 5C are electrically connected by wire harnesses WH and communicate signals therethrough (see FIG. 1). The current control unit 4C includes a microcomputer 40C made of one chip having an I/F circuit 41 for a torque sensor and I/F circuit 42 for a speed sensor, an output circuit for signals (not shown), a memory (not shown) such as EEPROM for storing data used by the microcomputer 40C and a watch dog timer (not shown).

The current control unit 4C incorporates signals T and V from a vehicle and determines a signal IMS for target current to be transmitted to the drive control unit 5C based upon the signals T, V.

The microcomputer 40C is described.

The microcomputer 40C has a device 40a for target current, a device 40c for damper compensation, a device 40d for inertia control and a device 40e' for inertia compensation.

The microcomputer 40C, which generates clock signals, executes processes based upon the clock signals and performs communication with the microcomputer 50C by clock synchronization. For this purpose, the microcomputer 40C transmits the clock signals to the microcomputer 50C.

The microcomputer 40C repeats processes in the devices 40a, 40d and 40e' for each primary process time so as to determine a signal IMS for target current. The signal IMS which the microcomputer 40C transmits to the microcomputer 50C is a signal (IMS)i for which only inertia compensation is made.

The device 40a for target current is described.

The device 40a is same as that of the first embodiment (see FIG. 2) except for the location to which the device 40a delivers a signal IMS for target current. In this case the device 40a delivers the signal IMS to the device 40e' for inertia compensation.

The device 40e' for inertia compensation is described.

The device 40e' receives the signal IMS from the device 40a and a signal for inertia control from the device 40d of inertia control, delivering a signal (IMS)i for target current (after inertia compensation) to be transmitted to the microcomputer 50C. The device 40e' makes addition of a signal IMS and a signal for inertia control, producing a signal (IMS)i for target current.

The structure of drive control unit 5C according to the third embodiment is described referring to FIG. 4.

The drive control unit 5C communicates with the current control unit 4C via wire harnesses WH which connect the two units electrically (see FIG. 1). The drive control unit 5C includes a microcomputer 50C of one microchip for drive control, a motor drive circuit 51, an I/F circuit 52 for motor current, a circuit 53 for R/D conversion, an output circuit for signals (not shown), a memory (not shown) such as EEPROM for storing data used by the microcomputer 50C and a watch dog timer (not shown).

The drive control unit 5C makes damper compensation for a signal (IMS)i for target current (after inertia compensation) based upon a speed signal SMO of motor rotation. The drive control unit 5C, which subsequently incorporates signals IMO and PMO from a vehicle, determines a signal VO for motor control based upon these signals along with a signal (IMS)di for target current (after damper and inertia compensation), thereby supplying current to drive a brushless motor 6.

The microcomputer 50C is described below.

The microcomputer 50C includes a device 50g for current conversion, a device 50h for conversion of rotational angle, a device 50i for computation of torque deviation, a device 50j for computation of magnetic field deviation, a device 50k for torque PI control, a device 50l for magnetic field PI control, a device 50m for voltage conversion and a device 50n for PWM conversion so as to determine a signal VO for motor control. The microcomputer 50C also includes a device 50b" for damper control and a device 50c" for damper compensation in order to make damper compensation for a signal (IMS)i for target current (after inertia control) transmitted by the microcomputer 40C.

The microcomputer 50C, which generates clock signals, executes processes based upon the signals. The microcomputer 50C communicates with the microcomputer 40C by clock synchronization using the clock signals transmitted by the microcomputer 40C.

The microcomputer 50C repeats processes in the devices 50g–50n for determining a signal VO for motor control and those in the devices 50b" and 50c" for performing damper compensation for each primary process time.

The device 50i for computation of torque deviation is described.

The device 50i is same as that of the first embodiment except for the location from which the device 50i receives a signal. In the third embodiment, the device 50i receives a signal (IMS)di for target current (after damper and inertia compensation) from the device 50c".

The device 50b" for damper control is described.

The device 50b" receives a speed signal SMO of motor rotation from the device 50h for conversion of rotational angle and delivers a signal for damper control to the device 50c" for damper compensation.

The device 50c" for damper compensation is described.

The device 50c" receives a signal (IMS)i for target current (after inertia compensation) transmitted by the microcomputer 40C and a signal for damper control from the device 50b", delivering a signal (IMS)di for target current (after damper and inertia compensation) to the device 50i. The device 50c" subtracts a signal for damper control from a signal (IMS)i, thereby producing a signal (IMS)di.

The operation of current control unit 4C and drive control unit 5C according to the second embodiment is described referring to FIGS. 1 and 4.

The microcomputer 40C determines a signal IMS for target current for each primary process time based upon a signal T' (digital signal) of steering torque and a signal V' (digital signal) of vehicle speed. In addition, the microcomputer 40C makes inertia compensation for the signal IMS based upon the signals T' and V'.

On the other hand, the microcomputer 50C generates a signal for damper control for each primary process time based upon a speed signal SMO of motor rotation. The microcomputer 50C then determines a signal (IMS)di for target current (after damper and inertia compensation) using this signal for damper control along with a signal (IMS)i for target current (after inertia compensation) transmitted by the microcomputer 40C. The microcomputer 50C determines a signal VO for motor control for each primary process time based upon the signal (IMS)di delivered by the device 50c" along with a signal IMO' (digital signal) of motor current and a signal PMO' (digital signal) of motor rotation.

Then, the motor drive circuit 51 imposes a motor voltage VM on a brushless motor 6 in the same manner as that described in the first embodiment based upon the signal VO for motor control. In this way, the brushless motor 6 drives in a positive or reverse direction to generate drive torque. The drive torque then acts on a steering line as assist torque, thereby assisting the steering torque exerted by a driver and improving steering thereof.

According to the third embodiment, since the microcomputer 50C performs damper control, it is not necessary to transmit a speed signal SMO of motor rotation from the microcomputer 40C to microcomputer 50C. In this way, the apparatus 1 for controlling an electric power steering system rules out a failure mode associated with transmission of a speed signal SMO between the microcomputers 40C and 50C, thereby can provide a securer control system for an excellent steering feeling by a simple arrangement.

It will now be appreciated from the foregoing description that the present invention is not limited to the particularly illustrated embodiments discussed above and may be carried out in various modified forms.

For example, though two microcomputers are arranged to be fully redundant each other in the first embodiment or each of them is able to serve as a microcomputer for both controlling of current and driving of a brushless motor, it may be possible to adopt a partially redundant approach. For example, only one microcomputer, which is considered to be highly resistant to failure, is assigned these two responsibilities, and the other microcomputer is assigned one responsibility. Or combination of the second or third embodiment with the first embodiment may also be an alternative.

In the first embodiment, one of two microcomputers, which are able to back up each other by having all the functions in common, takes over the execution of processes from the other computer if it fails. And the microcomputer executes the processes at a reduced number of operations by utilizing slots of vacant time. However, it may be alternatively possible to limit the functions, which two microcomputers have in common, to those required at the minimum so that the number of execution of the processes can be increased. For example, such arrangements may be selectable that feed forward control is introduced into a microcomputer for current control so that the microcomputer can determine a signal for motor control or a microcomputer for drive control is able to determine a target current without damper and inertia compensation.

In the second embodiment, a microcomputer for drive control judges with a signal of reception status whether or not damper compensation is made for a signal for target current. Another approach, which uses a flag of compensation for a signal for target current so that a microcomputer for current control can transmit the information of damper compensation with the flag, may be an alternative.

b. Sharing of Memory

An apparatus for controlling an electric power steering system according to a fourth embodiment, which has a memory like EEPROM in only one of a pair of units for controlling drive of a brushless motor for saving cost, such as a current control unit (microcomputer and the like) and a drive control unit (microcomputer and the like), transmits data from a unit having the memory to the other. In order for the drive control unit to receive the data transmitted by the current control unit safely, a standby signal is introduced. Specifically, the drive control unit transmits standby signals to the current control unit and then the latter unit transmits data to the former unit after reception of the standby signals.

The items described below which are same as those described in the aforementioned embodiments would be omitted, bearing the same symbols.

An apparatus for controlling an electric power steering system according to the fourth embodiment has a current control unit for setting target current to be supplied to a brushless motor and a drive control unit for driving the brushless motor based upon the target current, which are placed remotely each other and electrically connected by wire harnesses. The current control unit, which has a microcomputer of one chip for current control and an EEPROM for storing data, is disposed along a pinion shaft. On the other hand, the drive control unit, which has a microcomputer of one chip for drive control and a circuit for motor drive, is disposed next to a brushless motor. The microcomputers according to the present embodiment communicate each other by clock synchronization.

A signal V detected by a speed sensor VS and a signal T detected by torque sensor TS enter a current control unit 4D. And the current control unit 4D determines a signal IMS for target current to be supplied to a brushless motor 6, delivering the signal IMS to a drive control unit 5D. The current control unit 4D and drive control unit 5D are electrically connected by wire harnesses WH. The wire harnesses WH include wires CW for clock communication, wires TW for data transmission, wires RW for data reception and wires SW for communication of standby signal.

Figure 5:
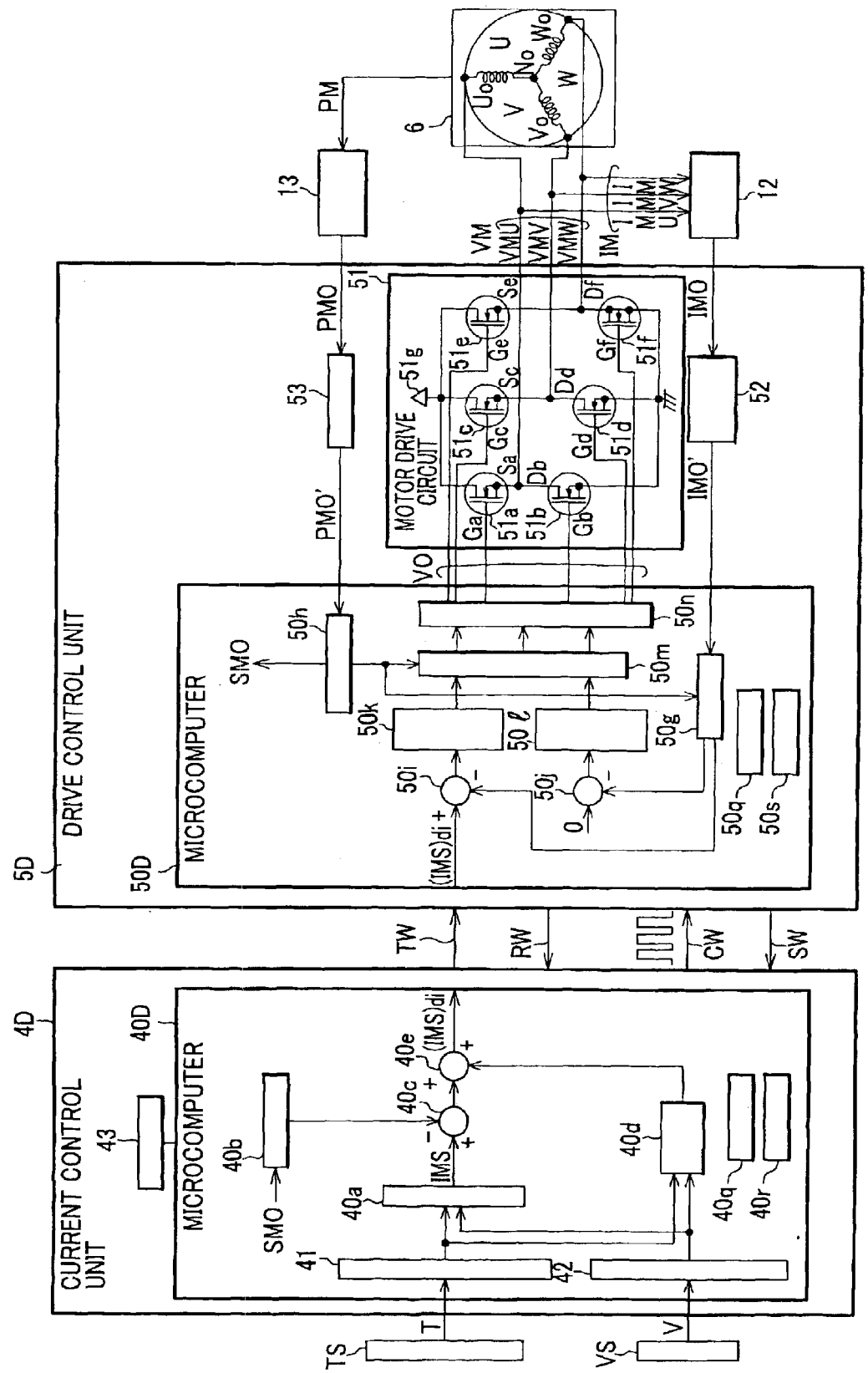
FIG. 5 is a block diagram showing current and drive control units according to the fourth embodiment.

The structure of current control unit 4D is described referring to FIG. 5. FIG. 5 is a block diagram showing current control and drive control units.

The current control unit 4D and drive control unit 5D are electrically connected by the wire harnesses WH and communicate signals therethrough (see FIG. 1). The current control unit 4D includes a microcomputer 40D made of one chip for current control including an I/F circuit 41 for a torque sensor and an I/F circuit 42 for a speed sensor, an output circuit for signals (not shown), a memory (not shown) such as EEPROM and a watch dog timer (not shown).

The current control unit 4D receives signals T and V from a vehicle and a speed signal SMO of motor rotation from the drive control unit 5D, determining a target current to be supplied to the brushless motor 6 based upon the incorporated signals T, V and SMO.

The current control unit 4D monitors the operation of microcomputer 40D with the watch dog timer. The current control unit 4D thus performs self monitoring and in addition sends signals of failure to the drive control unit 5D (microcomputer 50D) if the current control unit 4D detects the failure of microcomputer 40D by the watch dog timer. Further, the current control unit 4D sends watch dog pulses to the microcomputer 50D and checks the return of pulses sent back by the microcomputer 50D. In this way, the current control unit 4D also monitors the operation of microcomputer 50D.

Before moving on to the description of microcomputer 40D, an EEPROM 43 is described below.

The EEPROM 43, which the microcomputers 40D and 50D share, is electrically rewritable. The EEPROM 43 stores a central value for steering torque used by the microcomputer 40D, maps for determining a signal IMS for target current, a failure history of microcomputer 40D, an offset value for motor encoder used by microcomputer 50D and a failure history of microcomputer 50D. In this connection, the data stored in EEPROM 43 is rewritten at manufacturing factories or dealers.

The structure of microcomputer 40D is described.

The microcomputer 40D includes a device 40a for target current, a device 40b for damper control, a device 40c for damper compensation, a device 40d for inertia control, a device 40e for inertia compensation, a device 40q for generating clock signal and a device 40r for reception of standby signal so that the microcomputer 40D can determine a signal IMS for target current. The microcomputer 40D executes processes in the devices 40a–40e for each primary process time based upon clock signals generated by the device 40q so as to determine a signal IMS for target current.

The device 40q for generating clock signal is described.

The device 40q generates clock signals to be used by the microcomputer 40D as reference. The microcomputer 40D generates primary process time based upon the clock signals generated by the device 40q. The microcomputer 40D also communicates with the microcomputer 50D by clock synchronization using the clock signals. In this way, the microcomputer 40D transmits data via the wires TW for data transmission and also receives data via the wires RW for data reception. For this purpose, the microcomputer 40D transmits the clock signals to the microcomputer 50D via the wires CW for clock communication.

The device 40r for reception of standby signal controls a starting time of data transmission so that the microcomputer 50D can receive the data transmitted by the microcomputer 40D normally. For this purpose, the device 40r receives a standby signal transmitted by the microcomputer 50D via the wire SW monitoring HI/LO of the standby signal. If a standby signal indicates HI, the device 40r judges that the microcomputer 50D is ready to receive data, thereby permitting the microcomputer 40D to transmits data to the microcomputer 50D. On the other hand, if a standby signal indicates LO, the device 40r judges that the microcomputer 50D is not ready to receive data, thereby prohibiting the microcomputer 40D from transmitting data to the microcomputer 50D.

When an ignition switch IG is turned on (see FIG. 1), the device 40r permits the microcomputer 40D to transmit data after detection of a change from LO to HI in a standby signal. In parallel, the microcomputer 40D holds data transmission to the microcomputer 50D and starts data transmission when the permission is given. While the microcomputer 40D transmits data to the microcomputer 50D after the ignition switch IG is turned on, the device 40r prohibits data transmission if the device 40r detects a change from HI to LO in a standby signal. Accordingly, the microcomputer 40D stops data transmission intermittently to the microcomputer 50D. If the device 40r subsequently detects a change from LO to HI, the device 40r permits the microcomputer 40D to resume transmission of data to microcomputer 50D. Accordingly, the microcomputer 40D resumes data transmission to the microcomputer 50D.

Especially when the ignition switch IG is turned on, the microcomputer 40D reads out data stored in the EEPROM 43, transmitting those used by the microcomputer 50D thereto.

The drive control unit 5D is described referring to FIG. 5.

The drive control unit 5D communicates with the current control unit 4D via the wire harnesses WH which connect the two units electrically (see FIG. 1). The drive control unit 5D includes a microcomputer 50D of one chip for drive control, a motor drive circuit 51, an I/F circuit 52 for motor current, a circuit 53 for R/D conversion, an output circuit for signals (not shown) and a watch dog timer (not shown).

The drive control unit 5D incorporates signals IMO and PMO from a vehicle and a signal (IMS)di for target current (after damper and inertia compensation) from the current control unit 4D, generating a signal VO for motor control based upon the signals IMO, PMO and (IMS)di and supplying electricity to the motor drive circuit 51 in order to drive a brushless motor 6.

The drive control unit 5D monitors the microcomputer 50D by the watch dog timer. In addition to self monitoring, when the drive control unit 5D detects the abnormal operation (failure) of microcomputer 50D, the drive control unit 5D transmits failure signals to the current control unit 4D (microcomputer 40D). Further, the drive control unit 5D, which transmits watch dog pulses to the microcomputer 40D and monitors return pulses sent back by the microcomputer 40D, performs monitoring for the microcomputer 40D.

The microcomputer 50D for drive control is described.

The microcomputer 50D includes a device 50g for current conversion, a device 50h for conversion of rotational angle, a device 50i for computation of torque deviation, a device 50j for computation of magnetic field deviation, a device 50k for torque PI control, a device 50l for magnetic field PI control, a device 50m for voltage conversion and a device 50n for PWM conversion, a device 50q for generating clock signal and a device 50s for transmission of clock signal so as to determine a signal VO for motor control. The microcomputer 50D performs processes in the devices 50g–50n for each primary process time based upon clock signals generated by the device 50q so as to determine a signal VO for motor control.

The device 50q for generating clock signal is described.

The device 50q generates clock signals which the microcomputers 50D uses as reference. The microcomputer 50D generates primary process time based upon the clock signals. The microcomputer 50D communicates with the microcomputer 40D by clock synchronization based upon the clock signals transmitted by the microcomputer 40D, receiving data via the wires TW for data transmission and transmitting data via the wires RW for data reception.

The device 50s for transmission of standby signal is described.

The device 50s transmits standby signals to the microcomputer 40D via the wires SW so that the microcomputer 50D can receive the data transmitted by the microcomputer 40D normally. A standby signal, which has HI or LO status, indicates HI when the microcomputer 50D is ready to receive data or receiving data normally. On the other hand, a standby signal indicates LO when the microcomputer 50D is not ready to receive data or not receiving data normally.

When the ignition switch IG is turned on (see FIG. 1), the device 50s monitors whether or not the microcomputer 50D is ready to receive data transmitted by the microcomputer 40D. When the microcomputer 50D is not ready to receive data normally, the device 50s assigns LO to a standby signal. When the microcomputer 50D is ready to receive data normally, the device 50s assigns HI to a standby signal. As long as the microcomputer 50D is receiving data normally, the device 50s continues to assign HI to a standby signal. Also after the microcomputer 50D starts receiving data from the microcomputer 40D, the device 50s checks whether or not the microcomputer 50D is receiving data normally from the microcomputer 40D. If the microcomputer 50D is not receiving data normally, the device 50s assigns LO to a standby signal. Then if the device 50s confirms that the microcomputer 40D stops transmitting data, the device 50s assigns HI to a standby signal.

Monitoring of the readiness of microcomputer 50D is performed, for example, by checking if each device of the microcomputer 50D is electrically turned on or an initial check of the CPU of microcomputer 50D is completed. If this type of checking is performed when the ignition switch IG is turned on, a data shift at starting of data reception is prevented. Sum check or parity check for received data or checking if the microcomputer 50D receives data at predetermined time intervals is applied to detection for normal reception of data transmitted by the microcomputer 40D. This type of check can detect a possible data shift, which enables resumption of normal data reception even if a communication error occurs due to an effect of noise on the wires TW for data transmission.

The current control unit 4D and drive control unit SD are described referring to FIGS. 1 and 5. Two cases are exemplarily described below where the ignition switch IG is turned on and a data shift occurs due to an effect of noise on the wires TW while the microcomputer 50D is receiving data.

First, description is made for a case where the ignition switch IG is turned on.

When the ignition switch IG is turned on, each device of the current control unit 4D is turned on and the current control unit 4D supplies a constant voltage to the microcomputer 40D. The CPU of microcomputer 40D then performs an initial check. After the initial check, the microcomputer 40D receives standby signals transmitted by the microcomputer 50D via the wires SW for communication of standby signal. The microcomputer 40D monitors HI/LO of a standby signal and starts transmitting clock signals generated therein via the wires CW for communication of clock signal. The microcomputer 40D does not transmit data to the microcomputer 50D before the status of standby signal changes from LO to HI. The microcomputer 40D reads out the data stored in the EEPROM 43 to an internal Random Access Memory (RAM).

On the other hand, each device of the control unit 5D is also turned on and the control unit 5D supplies a constant voltage to the microcomputer 50D. The CPU of microcomputer 50D then performs an initial check. After the initial check, the microcomputer 50D judges if the microcomputer 50D is ready to receive data transmitted by the microcomputer 40D, transmitting standby signals of LO to the microcomputer 40D via the wires SW for communication of standby signal until the microcomputer 50D is ready for data reception. When the microcomputer 50D confirms that it is ready, the microcomputer 50D transmits standby signals of HI to the microcomputer 40D via the wires SW.

When the microcomputer 40D detects a change in standby signals from LO to HI, the microcomputer 40D stars transmitting data to the microcomputer 50D. The microcomputer 40D first transmits the data to be used by the microcomputer 50D, which is read out from the EEPROM 43 and on the RAM, by clock synchronization via the wires TW for data transmission.

Then, the microcomputer 50D receives the data by clock synchronization using the clock signals transmitted by the microcomputer 40D. As the microcomputer 50D is ready for data reception, it is able to receive the data normally. The microcomputer 50D then stores the received data into an internal RAM.

Subsequently, the microcomputer 40D determines a signal IMS for target current for each primary process time based upon a signal T' (digital signal) of steering torque and signal V' (digital signal) of vehicle speed, further performing damper and inertia compensation for the signal IMS based upon the signals T' and V' along with a speed signal SMO of motor rotation delivered by the microcomputer 50D. Also the microcomputer 40D monitors the status of HI/LO for a standby signal. In this connection, the microcomputer 40D transmits a signal (IMS)di for target current (after damper and inertia compensation) to the microcomputer 50D by clock synchronization via the wires TW for data transmission. In addition, the microcomputer 40D receives a speed signal SMO of motor rotation from the microcomputer 50D by clock synchronization via the wires RW for data reception.

On the other hand, the microcomputer 50D determines a signal VO for motor control for each primary process time based upon the signal (IMS)di, a signal IMO' (digital signal)

of motor current and a signal PMO' (digital signal) of motor rotation. Also the microcomputer 50D monitors whether or not the microcomputer 50D receives data normally from the microcomputer 40D. While the microcomputer 50D is receiving the data normally, the microcomputer 50D transmits standby signals of HI to the microcomputer 40D via the wires SW for communication of standby signal. In this connection, the microcomputer 50D receives a signal of (IMS)di for target current (after damper and inertia compensation) from the microcomputer 40D by clock synchronization via the wires TW for data transmission. In addition, the microcomputer 50D transmits a speed signal SMO of motor rotation to the microcomputer 40D by clock synchronization via the wires RW for data reception.

The motor drive circuit 51 performs selective PWM drive for FET51a–51f, thereby imposing a motor voltage VM (VMU of U phase voltage, VMV of V phase voltage and VMW of W phase voltage) on a terminal U0, V0 or W0 of the brushless motor 6. The motor drive circuit 51 sequentially changes FET51a–51f to be selectively driven and also controls the motor voltage VM so that the brushless motor 6 can be driven in a positive or reverse direction depending on a signal VO for motor control.

When the motor voltage VM is imposed on one of the winding of brushless motor 6, U phase, V phase or W phase, a motor current IM (IMU of U phase current, IMV of V phase current and IMW of W phase current) runs through the brushless motor 6. An inner rotor (not shown) then is driven in a positive or reverse direction and thereby a motor shaft (not shown) rotates accordingly. A device 12 for detection of motor current detects motor current IM and transmits a signal IMO of motor current to the drive control unit 5D. A device 13 for detection of motor rotation detects an angle PM of motor rotation of an inner rotor (not shown) and transmits a signal PMO of motor rotation to the drive control unit 5D.

The drive torque of a motor shaft (not shown) of brushless motor 6 is transmitted to a pinion shaft 7a via a torque limiter 10 and reduction gears mechanism 11. Then this drive torque acts on the pinion shaft 7a as assist torque, thereby assisting the steering torque exerted by a driver and improving steering thereof.

Next, description is made for a case where a data shift occurs due to an effect of noise on the wires TW for data transmission while the microcomputer 50D is receiving data.

As described before, the microcomputer 50D monitors whether or not the microcomputer 50D receives data from the microcomputer 40D. In this way, if a data shift occurs, the microcomputer 50D detects the failure, transmitting standby signals of LO to the microcomputer 40D via the wires SW for communication of standby signal. In this connection, after the occurrence of data shift, the microcomputer 50D is not able to execute normal drive control for the brushless motor 6 since the microcomputer 50D can not receive the signals such as a signal (IMS)di for target current (after damper and inertia compensation) normally.

On the other hand, the microcomputer 40D, which monitors the status of HI/LO for a standby signal, detects a change in standby signals from HI to LO. The microcomputer 40D then stops transmitting data to the microcomputer 50D intermittently.

After the data transmission to microcomputer 50D is stopped, the microcomputer 50D confirms a change in standby signals from HI to LO, transmitting standby signals of HI to the microcomputer 40D via wires SW for communication of standby signal.

Since the microcomputer 40D monitors a status of HI/LO for a standby signal, the microcomputer 40D detects a change in standby signals from LO to HI. The microcomputer 40D then resumes the transmission of data to the microcomputer 50D.

After the resumption of data transmission, the microcomputer 50D solves a data shift and receives data from the microcomputer 40D normally. In this way, the microcomputer 50D is able to determine normally a signal VO for motor control based upon a signal (IMS)di for target current (after damper and inertia compensation), thereby controlling the brushless motor 6 normally.

The motor drive circuit 51 imposes a motor voltage VM on the brushless motor 6 according to a signal VO for motor control determined by the microcomputer 50D. The brushless motor 6 then rotates in a positive or reverse direction and the drive torque acts on a steering line as assist torque. In this way, the brushless motor 6 assists the steering torque exerted by a driver, thereby improving steering thereof.

According to the apparatus 1 for controlling an electric power steering system, the microcomputers 40D and 50D can share a common EEPROM 43. Thus, the apparatus 1 enables a reduction in cost associated with apparatus. Since the microcomputer 50D monitors the status of data reception based upon standby signals, the microcomputer 50D is able to receive normal data when an ignition switch IG is turned on. Also even if an error of data reception occurs, the microcomputer 50D is able to recover, thereby resuming normal data reception.

It will now be appreciated from the foregoing description that the present invention is not limited to the particularly illustrated embodiment discussed above and may be carried out in various modified forms.

In the present embodiment, a microcomputer for current control, to which an EEPROM is electrically connected, transmits the data stored in the EEPROM to the other microcomputer for drive control. Alternatively, a microcomputer for drive control, which has an EEPROM, may transmit the data stored in the EEROM to the other microcomputer for current control.

Another type of memories such as an Electrically Programmable Read Only Memory (EPROM) and a mask Read Only Memory (ROM) may be selected instead of an EEPROM according to the present embodiment.

In the present embodiment, a standby signal of HI represents a status of normal data reception and a standby signal of LO represents a status of abnormal data reception, respectively. Other different approaches such as an approach exchanging HI and LO for a standby signal may be an alternative. Further, it may be possible to transmit a special signal in place of a standby signal only when a microcomputer is ready to receive data and resetting of data transmission is required.

c. Backup for Communication Failure

An apparatus for controlling an electric power steering system according to a fifth invention is described referring to the accompanying drawings. Description of items described below which are same as those described in the aforementioned embodiments would be omitted, bearing the same symbols.

When communication by clock synchronization cannot be performed due to failure, the apparatus according to the present invention can communicate by asynchronous technique switching from clock synchronization.

The apparatus according to the present embodiment has a current control unit for setting target current to be supplied to a brushless motor and a drive control unit for driving the brushless motor based upon the target current, which are placed remotely each other and electrically connected by wire harnesses. The current control unit, which has a microcomputer of one chip for current control, is disposed along a pinion shaft. On the other hand, the drive control unit, which has a microcomputer of one chip for drive control and a circuit for motor drive, is disposed next to a brushless motor. The microcomputers according to the present embodiment communicate each other by clock synchronization normally.

A signal T of steering torque detected by a torque sensor TS and a signal V of vehicle speed detected by a speed sensor VS enter a current control unit 4E. The current control unit 4E determines a signal IMS for target current to be supplied to a brushless motor 6 based upon signals T' and V' (digital signals) converted by an I/F circuit 41 for torque sensor and an I/F circuit 42 for vehicle sensor respectively, delivering a signal (IMS)di for a target current (after damper and inertia compensation) to a drive control unit 5E. The current control unit 4E and drive control unit 5E are electrically connected by wire harnesses WH. The wire harnesses WH include wires CW for communication of clock signal, wires TW for data transmission, wires RW for data reception and wires SW for communication of standby signal (see FIG. 6).

A signal IMO of motor current detected by a device 12 for detection of motor current and a signal PMO of motor rotation detected by a device 13 for detection of motor rotation enter the drive control unit 5E. The microcomputer 50E of drive control unit 5E generates a signal VO for motor control based upon signals IMO' and PMO' (digital signal), converted by an I/F circuit 52 for motor current and a circuit 53 for R/D conversion respectively, along with a signal (IMS)di for target current (after damper and inertia compensation) transmitted by the microcomputer 40E. A motor drive circuit 51 imposes a motor voltage VM on the brushless motor 6 based upon the signal VO (see FIG. 6). The drive circuit 5E is supplied with 12 V of battery electricity, electrically connected to a battery BT through fuses FS and an ignition switch SW. The drive control unit 5E generates a constant voltage of 5V, supplying it to the current control unit 4E.

Figure 6:
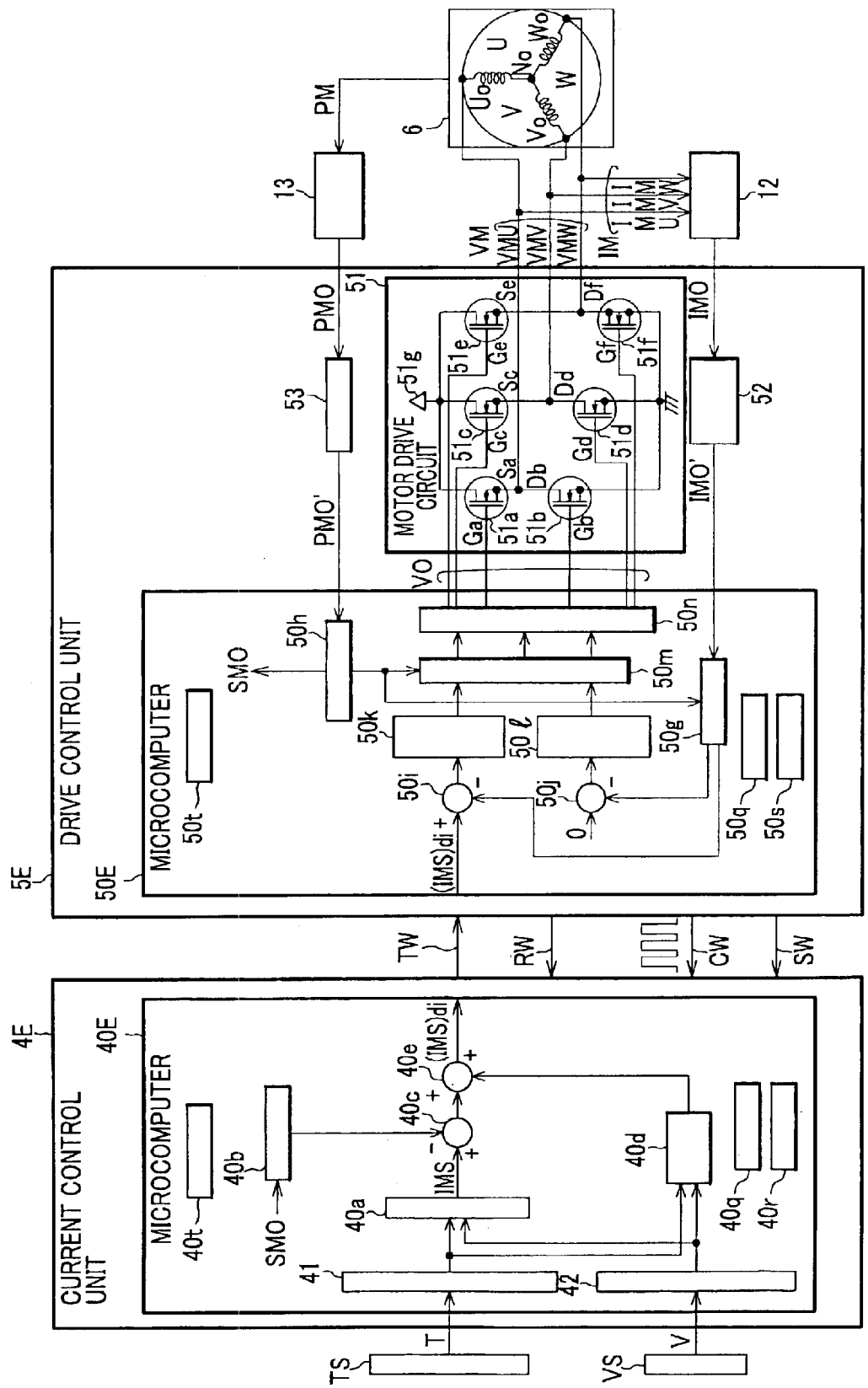
FIG. 6 is a block diagram showing current and drive control units according to the fifth embodiment.

The structure of current control unit 4E is described referring to FIG. 6. FIG. 6 is a block diagram showing current control and drive control units.

The current control unit 4E and a drive control unit 5E are electrically connected by the wire harnesses WH and communicate signals therethrough (see FIG. 1). The current control unit 4E includes a microcomputer 40E of one chip for current control including an I/F circuit 41 for torque sensor and an I/F circuit 42 for speed sensor, output circuits for signals (not shown), a memory (not shown) such as EEPROM and a watch dog timer (not shown).

The current control unit 4E receives signals T and V from a vehicle and a speed signal SMO of motor rotation from the drive control unit 5E, determining a target current to be supplied to the brushless motor 6 based upon the incorporated signals T, V and SMO.

The current control unit 4E monitors the operation of microcomputer 40E with the watch dog timer. The current control unit 4E thus performs self monitoring and in addition sends signals of failure to the drive control unit 5E (microcomputer 50E) if the current control unit 4E detects the failure of microcomputer 40E by the watch dog timer. Further, the current control unit 4E sends watch dog pulses to the microcomputer 50E and checks the return of pulses sent back by the microcomputer 50E. In this way, the current control unit 4E also monitors the operation of microcomputer 50E.

The structure of microcomputer 40E is described.

The microcomputer 40E includes a device 40a for target current, a device 40b for damper control, a device 40c for damper compensation, a device 40d for inertia control, a device 40e for inertia compensation, a device 40q for generating clock signal, a device 40r for reception of standby signal and a device 40t for communication control so that the microcomputer 40E can determine a signal IMS for target current. The microcomputer 40E executes processes in the devices 40a–40e for each primary process time based upon clock signals generated by the device 40q so as to determine the signal IMS.

The microcomputer 40E normally communicates with the microcomputer 50E by clock synchronization based upon the clock signals generated by the device 40q. When failure occurs in communication by clock synchronization, the microcomputer 40E switches to asynchronous method, thereby continuing communication with the microcomputer 50E. The failure includes the disconnection of wires CW for clock communication, failure of interface circuit for transmission or reception of clock signal (not shown) and failure in monitoring by the microcomputer 40E whether or not the microcomputer 50E is ready to receive data.

A device 40t for communication control is described.

The device 40t monitors the status of communication so that the microcomputer 40E can continue communication with the microcomputer 50E even if normal communication by clock synchronization cannot be performed. For this purpose, the device 40t monitors a status of HI/LO for a standby signal, measuring the time during which standby signals have a status of LO. The device 40t then decides that the microcomputer 50E is not able to communicate by clock synchronization if the measured time is longer than a predetermined switching time, thereby switching to asynchronous communication. When the device 40t does switching, the device 40t transmits switching signals to the microcomputer 50E. And if the microcomputer 50E transmits switching signals to the microcomputer 40E, the device 40t also switches the type of communication to asynchronous communication. Otherwise, the device 40t judges that communication by clock synchronization can be performed, thereby continuing communication by clock synchronization.

A period of time for switching is set to be longer than that for standby signal of LO which is estimated for resumption of communication by clock synchronization when an ignition switch IG is turned on or the microcomputer 50E cannot receive data normally. Transmission of signal for switching may be done via the wires TW for data transmission or a dedicated communication line.

In this connection, asynchronous communication, which controls a start and end of communication with a start signal (start bit) and a stop signal (stop bit), does not require common clock signals between a sender and recipient. However, a type of asynchronous communication, which executes processes using basic clock signals with a frequency that is 16 times as a bit rate, reduces the speed of communication compared with communication by clock synchronization.

The structure of drive control unit 5E is described referring to FIG. 6.

The drive control unit 5E communicates with the current control unit 4E via the wire harnesses WH which connect the two units electrically (see FIG. 1). The drive control unit 5E includes a microcomputer 50E of one microchip for drive control, a motor drive circuit 51, an I/F circuit 52 for motor current, a circuit 53 for R/D conversion, an output circuit for signals (not shown), a memory (not shown) such as EEPROM storing data used by the microcomputer 50E and a watch dog timer (not shown).

The drive control unit 5E incorporates signals IMO and PMO from a vehicle and a signal (IMS)di for target current (after damper and inertia compensation) from the current control unit 4E, generating a signal VO for motor control based upon the signals IMO, PMO and (IMS)di and supplying electricity to the motor drive circuit 51 in order to drive a brushless motor 6.

The drive control unit 5E monitors the microcomputer 50E by the watch dog timer. In addition to self monitoring, when the drive control unit 5E detects the abnormal operation (failure) of microcomputer 50E, the drive control unit 5E transmits failure signals to the current control unit 4E (microcomputer 40E). Further, the drive control unit 5E, which transmits watch dog pulses to the microcomputer 40E and monitors return pulses sent back by the microcomputer 40E, performs monitoring for the microcomputer 40E.

The microcomputer 50E for drive control is described below.

The microcomputer 50E includes a device 50g for current conversion, a device 50h for conversion of rotational angle, a device 50i for computation of torque deviation, a device 50j for computation of magnetic field deviation, a device 50k for torque PI control, a device 50l for magnetic field PI control, a device 50m for voltage conversion and a device 50n for PWM conversion, a device 50q for generating clock signals, a device 50s for transmission of clock signals and a device 50t for communication control so as to determine a signal VO for motor control. The microcomputer 50E performs processes in the devices 50g–50n for each primary process time based upon the clock signals generated by the device 50q so as to determine the signal VO.

The microcomputer 50E normally communicates with the microcomputer 40E by clock synchronization based upon the clock signal transmitted by the microcomputer 40E. When failure occurs in communication by clock synchronization, the microcomputer 50E switches to asynchronous method, thereby continuing communication with the microcomputer 40E.

Monitoring of the microcomputer 50E is performed, for example, by checking if each device of the microcomputer 50E is electrically turned on or an initial check of the CPU of microcomputer 50E is completed. If this type of checking is performed when the ignition switch IG is turned on, a data shift at starting of data reception is prevented. Sum check or parity check for received data, or checking if the microcomputer 50E receives data at predetermined time intervals is applied to detection for normal reception of data transmitted by the microcomputer 40E. This type of check can detect a possible data shift, which enables resumption of normal data reception even if a communication error occurs due to an effect of noise on the wires TW for data transmission.

The device 50t for communication control is described.

The device 50t monitors the status of communication so that the microcomputer 50E can continue communication with the microcomputer 40E even if normal communication by clock synchronization cannot be performed. For this purpose, the device 50t monitors the clock signals transmitted by the microcomputer 40E to measure a period of time during which the microcomputer 50E cannot receive the clock signals at all or normal clock signals.

The device 50t then decides that the microcomputer 50E is not able to communicate by clock synchronization if the measured period time is longer than a predetermined switching time, thereby switching to asynchronous communication. When the device 50t does switching, the device 50t transmits switching signals to the microcomputer 40E so as to notify starting of asynchronous communication. Further, if the microcomputer 40E transmits switching signals to the microcomputer 50E, the device 50t switches to asynchronous communication. Otherwise, the device 40t judges that communication by clock synchronization can be performed, thereby continuing communication by clock synchronization.

A period of time for switching is set to be longer than that for interruption of clock signals transmitted by the microcomputer 40E caused by resetting, or that for abnormal reception due to a disturbance of clock signals caused by an effect of noise. Transmission of signal for switching may be done via the wires TW for data transmission or a dedicated communication line. In this connection, the causes for the microcomputer 50E not being able to receive clock signals at all includes a disconnection of the wires CW for communication of clock signals or the failure of an interface circuit for transmission or reception of clock signals (not shown). Abnormal reception of clock signals is caused by an effect of noise.

The operation of current control unit 4E and drive control unit 5E is described referring to FIGS. 1 and 6. Descriptions are made for the cases where communication by clock synchronization can be normally performed between the microcomputers 40E and 50E, and the microcomputer 50E cannot receive clock signals normally due to a disconnection of the wires CW for communication of clock signal.

Description is made for the case where normal communication by clock synchronization can be performed.

The microcomputer 40E determines a signal IMS for target current for each primary process time based upon a signal T' (digital signal) of steering torque and signal V' (digital signal) of vehicle speed, executing damper and inertia compensation for the signal IMS using the signals T' and V' along with a speed signal SMO of motor rotation delivered by the microcomputer 50E.

The microcomputer 40E generates clock signals, transmitting the clock signals to the microcomputer 50E via the wires CW for communication of clock signal. Further, the microcomputer 40E judges that normal communication by clock synchronization can be performed based upon standby signals transmitted by microcomputer 50E and the clock signals. The microcomputer 40E transmits a signal (IMS)di for target current (after damper and inertia compensation) to the microcomputer 50E via the wires TW for data transmission. In addition, the microcomputer 40E receives a speed signal SMO of motor rotation from the microcomputer 50E via the wires RW for data reception.

On the other hand, the microcomputer 50E receives the clock signals transmitted by the microcomputer 40E via the wires CW for communication of clock signal. Further, the microcomputer 50E judges that normal communication by clock synchronization can be performed based upon the received clock signals. The microcomputer 50E receives the signal (IMS)di from the microcomputer 40E via the wires TW by clock synchronization using the received clock signals. The microcomputer 50E also transmits the speed signal SMO of motor rotation to the microcomputer 40E via the wires RW.

The microcomputer 50E determines a signal VO for motor control for each primary process time based upon a signal (IMS)di for target current (after damper and inertia compensation) and signals (digital signals) IMO' of motor current and PMO' of motor rotation.

The motor drive circuit 51 performs selective PWM drive for FET51a–51f depending on a signal VO for motor control, thereby imposing a motor voltage VM (VMU of U phase voltage, VMV of V phase voltage and VMW of W phase voltage) on a terminal U0, V0 or W0 of the brushless motor 6. The motor drive circuit 51 sequentially changes FET51a–51f to be selectively driven and also controls the motor voltage VM so that the brushless motor 6 can be driven in a positive or reverse direction depending on the signal VO.

When the motor voltage VM (VMU of U phase voltage, VMV of V phase voltage and VMW of W phase voltage) is imposed on one of the winding of brushless motor 6, U phase, V phase or W phase, a motor current IM (IMU of U phase current, IMV of V phase current and IMW of W phase current) runs through the brushless motor 6. An inner rotor (not shown) then is driven in a positive or reverse direction and thereby a motor shaft (not shown) rotates accordingly. A device 12 for detection of motor current detects motor current IM and transmits a signal IMO of motor current to the drive control unit 5E. A device 13 for detection of motor rotation detects an angle PM of motor rotation of an inner rotor (not shown) and transmits a signal PMO of motor rotation to the drive control unit 5E.

The drive torque of a motor shaft (not shown) of brushless motor 6 is transmitted to a pinion shaft 7a via a torque limiter 10 and reduction gears mechanism 11. Then this drive torque acts on the pinion shaft 7a as assist torque, thereby assisting the steering torque exerted by a driver and improving steering thereof.

Description is made for the case where the microcomputer 50E cannot receive clock signals due to failure such as a disconnection of the wires CW for communication of clock signals.

When the microcomputer 50E is not able to receive the clock signals transmitted by the microcomputer 40E, the microcomputer 50E starts measurement of time. If a period of time obtained by the measurement is equal to or greater than a switching time, the microcomputer 50E judges that it is not able to communicate with the microcomputer 40E by clock synchronization. The microcomputer 50E consequently switches to asynchronous communication, transmitting switching signals to the microcomputer 40E. The microcomputer 50E continues communication with the microcomputer 40E by asynchronous technique. In this way, the microcomputer 50E continues to receive a signal (IMS)di for target current (after damper and inertia compensation) and the like via the wires TW for data transmission, and to transmit a speed signal SMO of motor rotation via the wires RW for data reception.

On the other hand, the microcomputer 40E judges that the microcomputers 40E cannot communicate with microcomputer 50E by clock synchronization taking into account switching signals transmitted by the microcomputer 50E, thereby switching to asynchronous communication. The microcomputer 40E continues communication with the microcomputer 50E by asynchronous technique, transmitting a signal (IMS)di (after damper and inertia compensation) and the like via the wires TW for data transmission and receiving a speed signal SMO of motor rotation via the wires RW for data reception.

Subsequently, the microcomputer 40E determines a signal IMS for target current for each primary process time based upon signals (digital signals) T' of steering torque and V' of vehicle speed, further performing damper and inertia compensation for the signal IMS based upon the signals T' and V' along with a speed signal SMO of motor rotation transmitted by the microcomputer 50E.

The microcomputer 50E also determines a signal VO for motor control based upon a signal (IMS)di for target current (after damper and inertia compensation), a signal IMO' of (digital signal) motor current and a signal PMO' (digital signal) of motor rotation.

The motor drive circuit 51 imposes a motor voltage VM on the brushless motor 6 according to a signal VO for motor control determined by the microcomputer 50E. The brushless motor 6 then rotates in a positive or reverse direction, acting as assist torque on the steering torque exerted by a driver. As a result, the steering torque required for a driver will be relaxed.

The apparatus 1 for controlling an electric power steering system allows normal communication between the microcomputers 40E and 50E by asynchronous communication even if communication by clock synchronization fails due to a disconnection of the wires CW for communication of clock signals. In this way, the apparatus 1 is able to continue drive control of the brushless motor 6 with a combination of the microcomputers 40E for current control and 50E for drive control, thereby providing assist steering torque without intermittence.

It will now be appreciated from the foregoing description that the present invention is not limited to the particularly illustrated embodiment discussed above and may be carried out in various modified forms.

In the present embodiment, failure of communication by clock synchronization is detected by measuring a time period of reception of standby signals LO or that of no reception of normal clock signals. However, another method such as detection of failure in wires for communication of clock signals or an interface circuit for clock signals may be an alternative.

What is claimed is:

1. An apparatus for controlling an electric power steering system comprising:

a motor for providing assist steering torque for a steering line, said motor comprising a brushless motor;

a sensor for detection of steering torque acting on said steering line and delivering a signal of steering torque;

a device for detection of rotational phase of said motor and delivering a phase signal;

a device for detection of current of said motor and delivering a signal of current;

a current control unit for determining a signal for target current based upon at least said signal of steering torque, said current control unit comprising a first microcomputer;

a drive control unit for determining a signal for motor control for controlling said motor based upon a deviation between said signal for target current and said signal of current, along with said phase signal, said drive control unit comprising a second microcomputer and a motor drive circuit for driving said motor based upon said signal for motor control; and wires electrically connecting said current control unit and drive control unit, wherein said drive control unit incorporates said signal of steering torque from said sensor for detection of steering torque, and if said first microcomputer fails, said second microcomputer determines a signal for target current based upon said signal of steering torque.

2. An apparatus according to claim 1, wherein said first microcomputer incorporates said phase signal, and if said second microcomputer fails, said first microcomputer determines a signal for motor control for controlling said motor based upon said phase signal and delivers said signal for motor control to said motor drive circuit for driving said motor.

3. An apparatus according to claim 1, wherein said first microcomputer incorporates said phase signal from said second microcomputer and performs damper control, and if said first microcomputer can not receive said phase signal normally, said second microcomputer performs damper control based upon said phase signal.

4. An apparatus according to claim 1, wherein said second microcomputer performs damper control based upon said phase signal.

* * * * *